United States Patent [19]

Kroll et al.

[11] Patent Number: 4,817,004
[45] Date of Patent: Mar. 28, 1989

[54] ELECTRONIC POSTAGE METER OPERATING SYSTEM

[75] Inventors: Paul C. Kroll, New Milford; Sung S. Chang, Stamford, both of Conn.

[73] Assignee: Pitney Bowes Inc., Stamford, Conn.

[21] Appl. No.: 788,172

[22] Filed: Oct. 16, 1985

[51] Int. Cl.[4] .............................................. G06F 15/20
[52] U.S. Cl. ................................. 364/464.02; 364/900
[58] Field of Search ... 364/200 MS File, 900 MS File, 364/464, 466

[56] References Cited

U.S. PATENT DOCUMENTS

| | | | |
|---|---|---|---|
| 3,544,777 | 12/1970 | Winkler | 235/153 |
| 3,668,644 | 6/1972 | Looschen | 340/172.5 |
| 3,938,095 | 2/1976 | Check, Jr. et al. | 340/172.5 |
| 3,942,436 | 3/1976 | Lupkas | 101/93.43 |
| 3,978,457 | 7/1976 | Check, Jr. et al. | 340/172.5 |
| 4,093,999 | 6/1978 | Fuller et al. | 364/900 |
| 4,180,856 | 12/1979 | Check, Jr. et al. | 364/466 |
| 4,251,874 | 2/1981 | Check, Jr. et al. | 364/900 |
| 4,285,050 | 8/1981 | Muller | 364/900 |
| 4,287,825 | 9/1981 | Eckert, Jr. et al. | 101/91 |
| 4,301,507 | 11/1981 | Soderberg et al. | 364/464 |
| 4,335,434 | 6/1982 | Baumann et al. | 364/464 |
| 4,385,308 | 5/1983 | Uchida | 357/41 |
| 4,408,303 | 10/1983 | Guterman | 365/205 |
| 4,445,198 | 4/1983 | Eckert | 364/900 |
| 4,484,307 | 11/1984 | Quatse et al. | 364/900 |
| 4,584,647 | 4/1986 | Eckert | 364/900 X |
| 4,627,016 | 12/1986 | Kirschner et al. | 364/900 |
| 4,675,841 | 6/1987 | Check, Jr. et al. | 364/900 |
| 4,713,769 | 12/1987 | Hills et al. | 364/464 |

FOREIGN PATENT DOCUMENTS 0085385 8/1983 European Pat. Off. .
0173249 3/1986 European Pat. Off. .
8402409 6/1984 PCT Int'l Appl. .

Primary Examiner—Parshotam S. Lall
Assistant Examiner—Edward R. Cosimano
Attorney, Agent, or Firm—Donald P. Walker; David E. Pitchenik; Melvin J. Scolnick

[57] ABSTRACT

A postage meter system includes a nonvolatile memory and program store coupled to a microcomputer. Postage meter transactional accounting data records are stored in the nonvolatile memory. Each transactional accounting data record includes a header portion having piece count related data and a piece count data field. The most current stored transactional accounting record header includes piece count related data which differs from the piece count data in the piece count field. Other stored transactional accounting records have headers with piece count related data which are the same as the piece count data stored in the piece count field. In this way, the most current record can be rapidly identified. A ring buffer organization of nonvolatile memory locations are utilized for storing postage value setting prior to the commencement of a postage dispensing transaction. By utilizing the ring buffer postage setting data and the most current postage transactional accounting record, a postage meter transaction can be reconstructed and written into a new postage transactional accounting record should a fault occur during a transaction which would preclude the writing of valid data. A program store causes the microcomputer to write a full set of critical postage accounting data into a random access memory, a second full set of critical accounting data and a set of abbreviated critical accounting data into the nonvolatile memory. The program store further causes the microcomputer, when an error is detected in at least one of the nonvolatile memory records, upon a comparison of data, where data in the random access memory is used as the accurate reference data, to rewrite data into both the full record and the abbreviated data record stored in the nonvolatile memory.

12 Claims, 25 Drawing Sheets

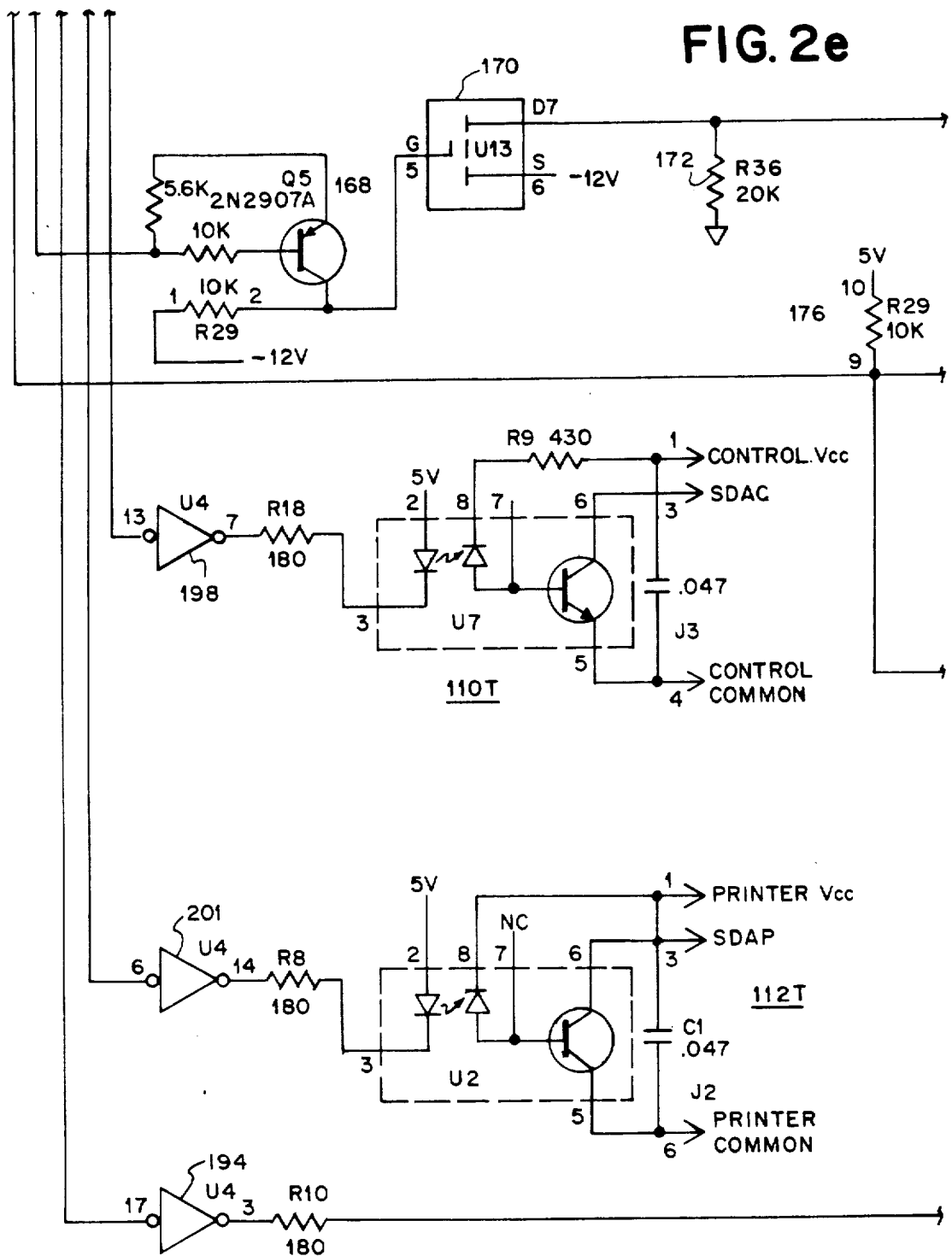

ELECTRONIC POSTAGE METER OPERATING SYSTEM

RELATED APPLICATIONS

Reference is made to U.S. patent application of Paul C. Kroll and Sung S. Chang Ser. No. 787,877 concurrently filed herewith for NONVOLATILE MEMORY PROTECTION ARRANGEMENT FOR ELECTRONIC POSTAGE METER SYSTEM HAVING PLURAL NONVOLATILE MEMORIES and U.S. patent application of Paul C. Kroll and Sung S. Chang, Ser. No. 788,171, also concurrently filed herewith for ELECTRONIC POSTAGE METER HAVING ARRANGEMENT FOR RAPID STORAGE OF CRITICAL POSTAGE ACCOUNTING DATA IN PLURAL NONVOLATILE MEMORIES. Both patent applications are assigned to Pitney Bowes Inc.

U.S. Pat. No. 4,301,507 for ELECTRONIC POSTAGE METER HAVING PLURAL COMPUTING SYSTEMS issued to Soderberg, Eckert, and McFiggans on Nov. 17, 1981, is hereby incorporated by reference into the present application.

FIELD OF THE INVENTION

The present invention is directed to nonvolatile memory systems, and more particularly, nonvolatile memory systems for electronic postage meters.

BACKGROUND OF THE INVENTION

Postage meters are mass produced devices for printing a defined unit value for governmental or private carrier delivery of parcels and envelopes. The term postage meter also includes other like devices which provide unit value printing such as tax stamp meters. Postage meters include internal accounting devices which account for postage value representation which is stored within the meter. The accounting device accounts for both the recharging of the meter with additional postage value and the printing of postage by the meter printing mechanism. No external independent accounting system is available for accounting for the postage printed by the meter. Accordingly, postage meters must possess a high reliability to avoid the loss of user or governmental funds stored within the meter and dispensed by printing postage.

Electronic postage meters have been developed and are disclosed, for example, in U.S. Pat. No. 3,978,457 for MICROCOMPUTERIZED ELECTRONIC POSTAGE METER SYSTEM; in U.S. Pat. No. 4,301,507 for ELECTRONIC POSTAGE METER HAVING PLURAL COMPUTING SYSTEMS; and, in U.S. Pat. No. 4,484,307, for ELECTRONIC POSTAGE METER HAVING IMPROVED SECURITY AND FAULT TOLERANCE FEATURES. Such meters have electronic accounting circuits which include electronic non-volatile memory capability for storing postage accounting information. The accounting circuits and associated postage printing mechanism are physically sealed within a tamper resistant enclosure. The non-volatile memories are provided for storing critical postage accounting information when external operating power is not applied to the meter.

Various types of accounting information may be stored in the meter non-volatile memory. This information includes, for example, the total amount of postage remaining in the meter for subsequent printing (descending register) and the total amount of postage printed by the meter (ascending register). Other types of accounting or operating data may also be stored. For example, service information in the form of error codes denoting various types of malfunctions or abnormal conditions encountered during operation of the meter may be stored in non-volatile memories. This facilitates the evaluation of the operating experience of each meter to assist in its repair, should that be necessary, and to accumulate data helpful in the design of electronic postage meters.

Non-volatile memories as well as the other electronic accounting circuitry within electronic postage meters are susceptible to disturbances which can either destroy information or cause erroneous information to be generated. The electronic circuits are susceptible to electromagnetic radiation and electrical transients which can interfere with the proper operation of the meter and accurate storage of information. These types of effects can result in a loss of funds to the users and, accordingly, it has been recognized that various types of protection must be provided to avoid such undesirable results as the data cannot be reconstructed in most instances from other externally available records.

Electronic postage meters of the type that write to nonvolatile memories only during power down sequence such as disclosed in above identified U.S. Pat. No. 4,301,507, operates satisfactorily for their intended purposes. However, if a difficulty occurs during the several millisecond when external power is removed and the capacitance within the system provides the power to write, critical accounting information may be lost. This information may not be able to be reconstructed because it is not stored in other nonvolatile memories.

Systems have also been developed, such as disclosed in U.S. Pat. No. 4,484,307 for ELECTRONIC POSTAGE METER HAVING IMPROVED SECURITY AND FAULT TOLERANCE FEATURES, and published European Patent Application, Publication No. 0 085 385 for MICROPROCESSOR SYSTEMS FOR ELECTRONIC POSTAGE METERS which have memories wherein data is written into nonvolatile memories during each operation of the meter. Other electronic postage meter systems, such as disclosed in abandoned U.S. patent application of Wallace Kirschner, Easwaran C. N. Nambudiri and Douglas H. Patterson, Ser. No. 643,219, filed Aug. 22, 1984, for NONVOLATILE MEMORY SYSTEM WITH REAL TIME AND POWER DOWN DATA STORAGE CAPABILITY FOR AN ELECTRONIC POSTAGE METER, where dual nonvolatile memories are employed, one wherein data is written during each operation of the meter and another wherein data is written only during a power down sequence.

SUMMARY OF THE INVENTION

It has been discovered that electronic systems such as described above can be improved by an improved circuit and software arrangement.

The organization of the system is such that information is written into nonvolatile memories, under predetermined operating conditions and in a manner which enhances the reliability of the system.

A postage meter system in accordance with the present invention includes nonvolatile memory means and program store means coupled to a microcomputer means. Postage meter transactional accounting data records are stored in the nonvolatile memory. Each transactional accounting data record includes a header portion having piece count related data and a piece count data field. The most current stored transactional accounting record header includes piece count related data which differs from the piece count data stored in the piece count field. Other stored transactional accounting records have headers with piece count related data which are the same as the piece count data stored in the piece count field. In this way, the most current record can be rapidly identified.

In accordance with the present invention nonvolatile memory locations are utilized for storing postage value setting prior to the commencement of a postage dispensing transaction. By utilizing the ring buffer postage setting data and the most current postage transactional accounting record a postage meter transaction can be reconstructed and written into a new postage transactional accounting record should a writing into nonvolatile memory fault occur during the concurrence of a postage meter transaction and the powering down of the postage meter system.

In accordance with another feature of the present invention, a random access memory means and program store means are coupled to the microcomputer means. The program store means causes the microcomputer means to write a full set of critical postage accounting data into the random access memory, a second full set of critical accounting data and a set of abbreviated critical accounting data into the nonvolatile memory. The program store means further causes the microcomputer means, when an error is detected in at least one of the nonvolatile memory records, upon a comparison of data, where data in the random access memory is used as the accurate reference data, to rewrite data into both the full record and the abbreviated data record stored in the nonvolatile memory.

BRIEF DESCRIPTION OF DRAWINGS

FIG. 2e is a detailed schematic diagram of still further circuitry the accounting system shown in FIG. 1, including output circuitry for coupling the microprocessor of FIG. 2b to the printer;

DETAILED DESCRIPTION OF THE PREFERRED EMBODIMENT

Circuit Architecture Overview

Figure 1:
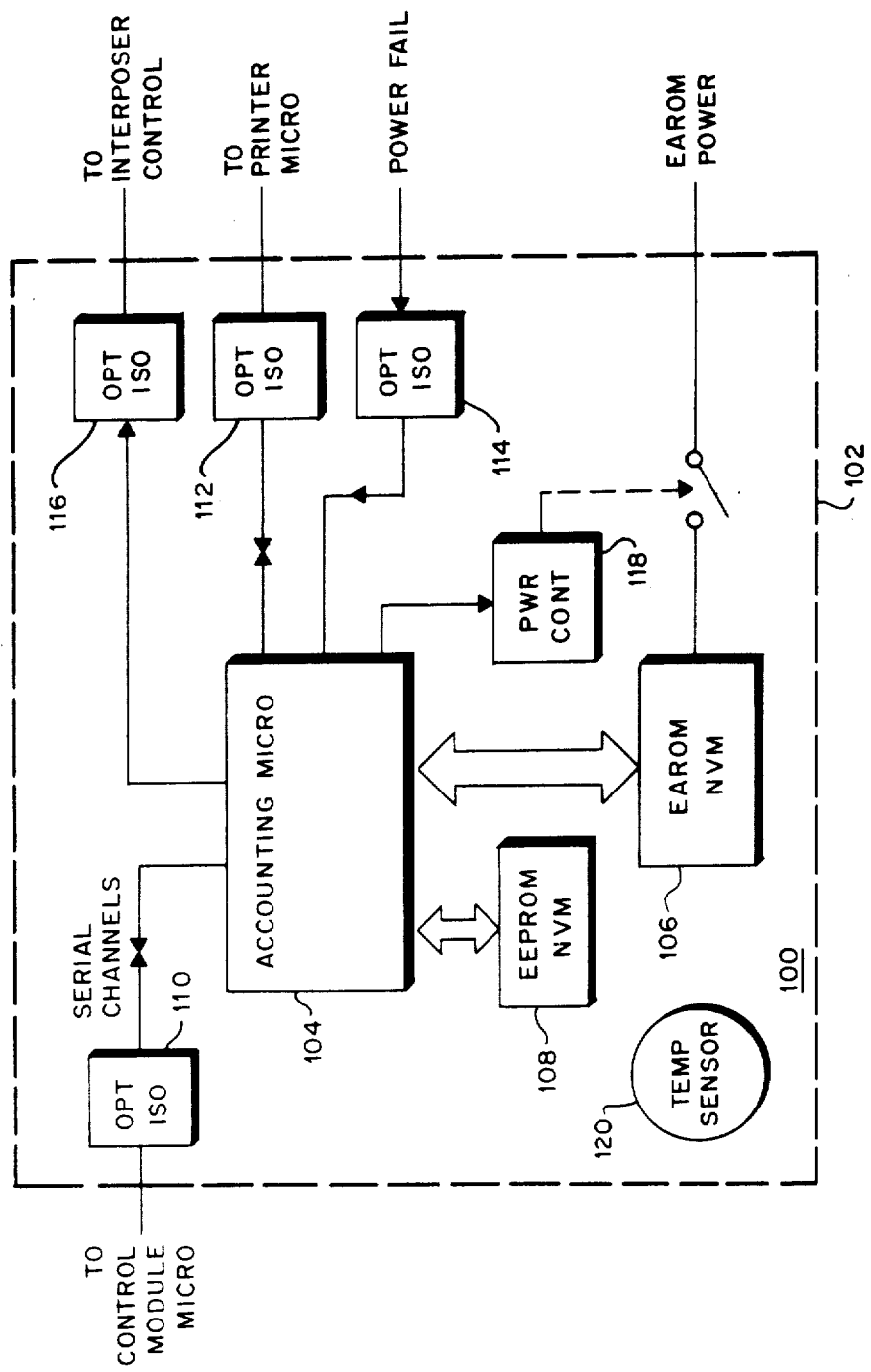
FIG. 1 is a simplified perspective view of a postal meter showing a simplified diagram of a circuit for the accounting system of the meter in accordance with the invention.

In the present system both a floating gate EEPROM type nonvolatile memory and an MNOS type nonvolatile memory are employed in conjunction with a microprocessor having a random access volatile memory. The random access memory, as in the present system, may reside on the integrated circuit chip which contains the microprocessor. The system is designed so that information from the microprocessor is both written into the random access memory and into the EEPROM memory on a transactional basis. The information is written into both the EEPROM memory and the MNOS nonvolatile memory during a power down routine. Additionally, writing can occur to both the EEPROM nonvolatile memory and the MNOS memory during block switching times, as for example, when the service mode switch is moved from the operating position to the service mode position.

A unique system of interleaving the writing between the EEPROM memory and the MNOS memory enables the data to be written into both memories during power down without extending the period of time necessary to write into either of the memories individually. This greatly enhances the reliability and security of the meter without additionally providing further risks that information may be lost during power down.

The writing technique is such that the writing is interleaved. That is, a byte of information is first written into the EEPROM memory. Since it takes two milliseconds for the information to be written into the EEPROM memory locations after the data is put on the EEPROM memory data line ports, this time period is used for writing two nibbles of data into the MNOS memory. This memory is nibble oriented and the writing time takes one millisecond per nibble. Thus, during the wait period while the data is being written into the EEPROM nonvolatile memory the same data is simultaneously being written into the MNOS type nonvolatile memory. The interleaving continues until both memories are fully loaded with the relevant data necessary to be stored during a power down sequence.

The above writing sequence for the particular design involved may take approximately 60 to 70 milliseconds while the power from the capacitance store which is available for continued operation of the meter after a power failure is detected is in the range of 200 milliseconds.

As a further protection because of the necessity for the particular circuit disclosed to output a 16 bit address at port 2 of the microprocessor, here an 8051 type microprocessor, when writing to the EEPROM nonvolatile memory, and since the MNOS memory is also connected to port 2 of the 8051 microprocessor, the addressing scheme for the EEPROM memory has been selected such that the data lines coupled to the MNOS memory always are at a high, or one value, whenever the EEPROM memory is addressed for the purpose of either writing or reading. This is of a particular importance in protecting the data in the MNOS memory because of the manner in which writing must occur in this memory. It should be noted that to write into the MNOS nonvolatile memory it is necessary to first erase the 4 bit locations to be written into. To achieve this, it is necessary to write ones (1) into each of the memory locations and this must be done for a period of time of approximately 10 milliseconds to erase the location and therefore enable a later write to occur. As a result of this arrangement for the data input, the data lines of the MNOS memory are connected in a unique manner, specifically, to different pins of the same port as the high order address lines of the EEPROM memory.

With the data lines of the MNOS memory held high for a period of approximately 2 milliseconds when the EEPROM memory is being addressed, the MNOS memory is put into a condition wherein inadvertent writing into memory location is prevented. This is because should the write enable line inadvertently be activated during this period of time, the memory locations with a 1 in them would not change since a 1 is being written in. On the other hand memory locations with a 0 would also not be changed because they had not previously been erased and made a 1 to enable the writing step to occur. Additionally, the erasing process cannot occur because it takes approximately 10 milliseconds to erase a location to enable the memory location to be written into and the EEPROM addressing timing is only 2 milliseconds.

As a further feature of the present organization it should be noted that the circuit organization and architecture is such that minimal lines are shared between the EEPROM nonvolatile memory and the MNOS nonvolatile memory. This provides a high degree of "separation" and a level of protection. Physically, the two memory devices share only 10 I/O lines of the microcontroller. For the MNOS memory, all 10 shared lines are used only for latching the address. The control lines such as chip enable, read enable, write enable, and the like, are totally separated between the two chips. Such separation can help in reducing any possible mutual interference.

Software Architecture Overview

The software operating the system and the memory mapping arrangement for storing data, particularly in the EEPROM memory, provide a high degree of redundancy hither to unavailable in previous electronic postage meters. It has been discovered that by organizing the real time accounting into two sets of 20 records in the EEPROM memory in a unique manner, additional reliability can be achieved. Firstly, in the unlikely event a particular memory component is unavailable, the software architecture has been established so that it can function with either the nonvolatile MNOS nonvolatile memory present or removed from the system. Moreover, the addressing technique for writing into the EEPROM memory has eliminated the need for a separate pointer used in previous designs. Specifically, it has been discovered that data from the piece counter can be used in the header of the records stored in the EEPROM memory as a logical record pointer indicating where the record should be written after a trip has occurred. In the particular embodiment disclosed, it is the last, least significant 5 bits of the piece counter which provides the logical pointer for the record into which the data should be written.

Moreover, it has been discovered by placing the piece counting data into the header of each record quick identification can be achieved of the most current record stored in the EEPROM memory without the necessity, as in previous systems, of writing header location information twice per trip, once to indicate new records and once to indicate old records. Moreover, the technique allows the rapid access of desired records by a technique which permits a quick search and identification of desired information. The organization of the memory is such that there are two sets of twenty records stored in the EEPROM memory. When the meter is put into service, the memory locations are initialized so that proper data is stored in all memory locations. The use of the piece count data in the header of each record set allows a quick indication of both the oldest and the most current (previous) records stored. The most current stored record includes the oldest piece count number which is updated only after a trip has been completed.

In the above manner, in conjunction with information concerning the setting of the postage value in a ring buffer stored in nonvolatile memory, which data is stored prior to the commencement of a trip, should any malfunction occur reconstruction using the ring buffer postage setting data and the most current (previous) record allows a recovery from the fault by using the postage value ring buffer setting to update records. This avoids the necessity to pull meters out of service due to the inability to recover from a single "bad trip". That is, a meter operation where data concerning the trip is not accurately recorded. As an additional feature in the memory organization, error counter information is maintained for a number of separate error conditions. This allows enhanced analysis of failure and fault conditions which may occur in the meter when the memory contents are read and analyzed.

It should be noted that the two sets of twenty records are designed so that the primary record has full data. That is the record contains a nonvolatile memory write soft error counter or pointer to remap record; a closing counter (write on next trip); a piece counter; a CRC of descending register; descending register; CRC of ascending register; ascending register; CRC of data from the byte 2 to byte 10 hex, this provides a CRC for insuring that the critical data is correct; postage value setting; batch amount; batch count; PIN number (for parcel registers only); printer status when trip bit is cleared, i.e. this byte is written only when the trip is completed; and, lastly, a CRC from data from bytes 2 to byte 1C hex which is the CRC of the entire record. In sharp contrast, the back up trip record contains abbreviated information of critical accounting data specifically the information stored from byte 2 to byte 10 hex mentioned above. Additionally, as a technique for providing enhanced security a nonvolatile memory write soft error counter or pointer to a remapped record is written in the backup record although not at the time of the transaction or trip. It is an error counter which is written into only when an error is detected and written into memory. This is the same case for the main record.

The software functions such that the accounting microprocessor verifies critical data of both trip records stored in the EEPROM and rewrites them if necessary. Specifically, after a trip is completed the current critical data resides in three locations in the meter. A first set of critical data is stored in the microprocessor RAM, a second full set of critical data is stored in the EEPROM memory and a third set of abbreviated critical data is stored also in the EEPROM memory. If upon the comparison (wherein the data in the RAM is used as the accurate reference data) an error is detected, a rewrite step occurs. That is, data is rewritten into the EEPROM memory and thereafter compared to insure it matches the data stored in the RAM. This is done both for the full record stored in the EEPROM and the abbreviated data stored in the EEPROM. It should be noted that the full record of the EEPROM memory is not compared; only the critical data portion of the full record is compared. If, after an error in the critical data is detected and a rewriting process has occurred successfully, a soft error counter is incremented to note the difficulty encountered in writing into the EEPROM memory.

Another major feature of the software is the remapping of the trip record. Specifically the EEPROM memory is organized such that there are 8 record locations saved in reserve. That is 4 record locations for the main full record and 4 record locations for the abbreviated record. These locations are normally not utilized in the operation of the meter. In the unlikely event a primary record location for either the full data or the abbreviated data occurs which can be a hardware failure such as a memory cell failure and the like, the system is designed to activate an unused set of record locations. This is done in conjunction with a pointing technique which remaps the primary location to the new activated secondary location. Thus, the reserve secondary location functions in the capacity of the primary location when this occurs. This all occurs under software control and this error condition is noted by the soft error counter for the particular record location exceeding its maximum, which in the present instance is 9, or a rewrite attempt fails. Thus, a write fails and the second rewrite attempt additionally fails.

The software is further organized to allow an infrequent error or transient condition to occur and continue the meter in service, however, if the transient error occurs more frequently, the meter is permanently lock out. For example, if the microprocessor jumps inadvertently for some reason to an unused or spare location the meter will continue in service if such does not happen too frequently, for example only once every 10,000 meter trip cycles. Other errors can be treated in the same manner. This allows segregation of meters which have a severe but very transient error and those which have a severe but more frequent error which should be removed from service and corrected by setting a flag in the nonvolatile memory such that even if the error condition is removed the meter cannot be initialized by power down and power up.

Additional features are provided in the software system to enable an access to descending register stored in the nonvolatile memory locations from the keyboard and the ability to dump the contents of the transactional EEPROM memory without taking the meter out of service by an external device which communicates with the meter.

Reference is now made to the drawings wherein like reference numerals designate similar elements in the various views.

Circuit Operation

Reference is now made to FIG. 1. An alternate form of an accounting control system for a postal meter is disclosed from that shown in FIG. 5 of U.S. Pat. No. 4,301,507 noted hereinabove. The accounting system 100 includes an enclosure 102, the walls of which may be formed to provide electromagnetic shielding. The circuits within the enclosure 102 include an accounting microcomputer 104 operatively connected to two nonvolatile memories. The first nonvolatile memory 106 is an EAROM MNOS type nonvolatile memory. The second nonvolatile memory 108 is an EEPROM nonvolatile memory. Nonvolatile memory 106 may, for example be an ER3400 manufactured by General Instruments Corporation, Hicksville, N.Y. and described in "EAROM" published November 1977 by General Instruments Corporation and in Bulletin 1203A, "Using the ER3400" published by General Instruments Corporation. The second nonvolatile memory 108 may be a floating gate electrically erasable programmable read only memory, as for example, part number DE5516A manufactured by SEEQ Technology Incorporated, San Jose Calif. and described in "2816A/5516A Timer E$^2$ 16K Electrical Erasable ROMs", Preliminary Data Sheet, published February 1984 by SEEQ Technology Incorporated, San Jose, Calif.

The accounting microcomputer 104 controls the application of stored data to the two nonvolatile memories 106 and 108 in accordance with the present invention. The accounting microcomputer 104 includes a random access memory which includes working ascending registers, working descending registers and the like. The accounting microcomputer 104 also includes a read only memory control for the necessary routines which will be described in greater detail hereinafter.

The accounting system 100 incorporates a serial interface, to enable interfacing with the printing and control modules disclosed in the above noted U.S. Pat. No. 4,301,507. The microcomputer, may for example, comprise an 8051, 8052 or 8751 type series microcomputer from Intel Corporation, Santa Clara, Calif. In order to avoid damage to the accounting system 100 by electrical surges applied accidentally or intentionally, and to eliminate electrical noise induced via ground loops, the accounting microcomputer 104 communicates with the devices external of the compartment 102 by suitable isolators that are not capable of applying voltage surges to the microcomputer. These isolators may, for example, be in the form of opto-electronic couplers, and are also preferably arranged so as to be inaccessible from the exterior of the postal meter. One isolator unit 110 may be provided for the two way communication path with the control unit. A further isolator arrangement 112 may be provided for the two way communication with the printer unit. A still further isolator 114 may be provided for applying the power sensing signal to the microcomputer 104. In addition, an isolator 116 may be provided for controlling an interposer in the printer for mechanically blocking functions of the printer.

The purpose of the power control circuit 118 is to provide power to the system to enable a data transfer operation during power down operations to be completed when external power fails. The program of the microcomputing unit 104 is organized to enter the contents of the registers of the microcomputer and, as appropriate to random access memory, into the nonvolatile memories 106 and 108 as soon as an indication of failure of the power supply occurs, and to restore this data to the working registers upon restoration of power as will be more fully explained hereinafter.

The enclosure 102 may further include a temperature sensor 120, with suitable circuits, not shown, so that the microcomputer will operate to transfer data to the nonvolatile memory in the event of excess temperatures by entering a power failure mode if the temperature is above or below predetermined limits, as for example, 70° C. or 0° C., respectively.

The system may prevent the operation of the meter interposer solenoid, not shown, by way of the isolator 116, in the event of excessive temperatures. It will be appreciated that the interposer is controlled by the microcomputer 104 also to inhibit operation of the printer in the event that insufficient postage remains for a printing operation, or other accounting data indicates that the meter should not be operative.

While the isolators have been indicated as individual units, it is, of course, apparent that these units may incorporate multiple devices, so that two way communications is established in the respective circuits.

Figure 2:
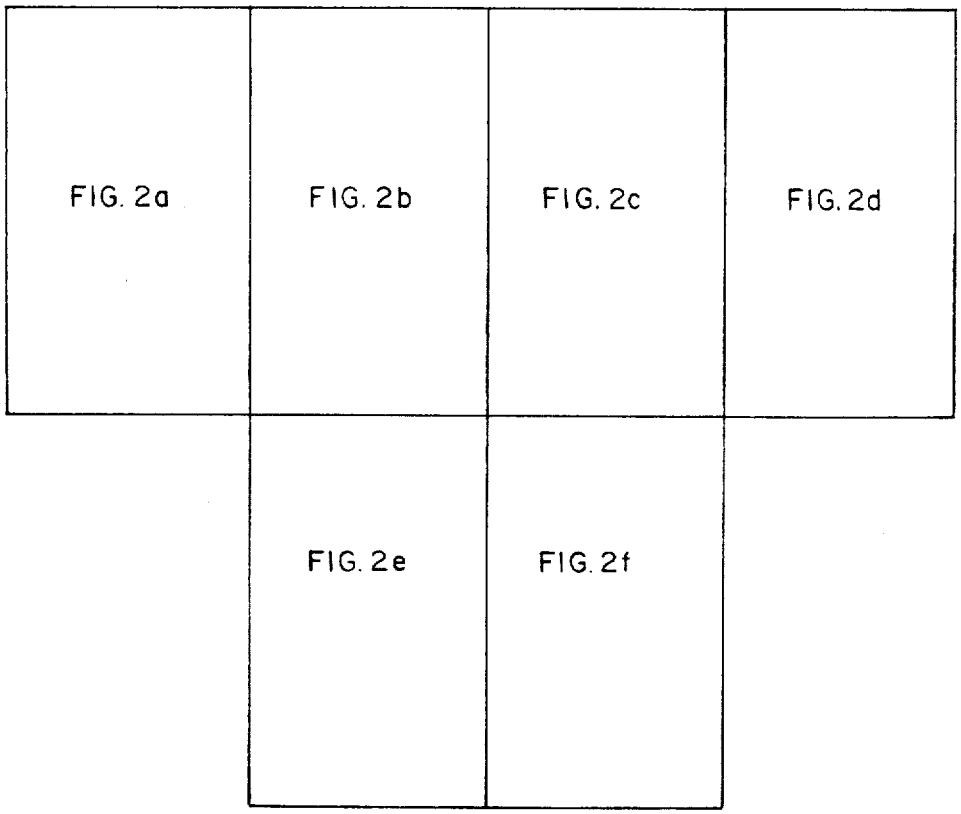
FIG. 2 is a schematic of the manner in which FIGS. 2a, 2b, 2c, 2d, 2e and 2f interconnect to one another for showing the detailed schematic circuit diagram of the accounting system shown in FIG. 1.
Figure 2A:
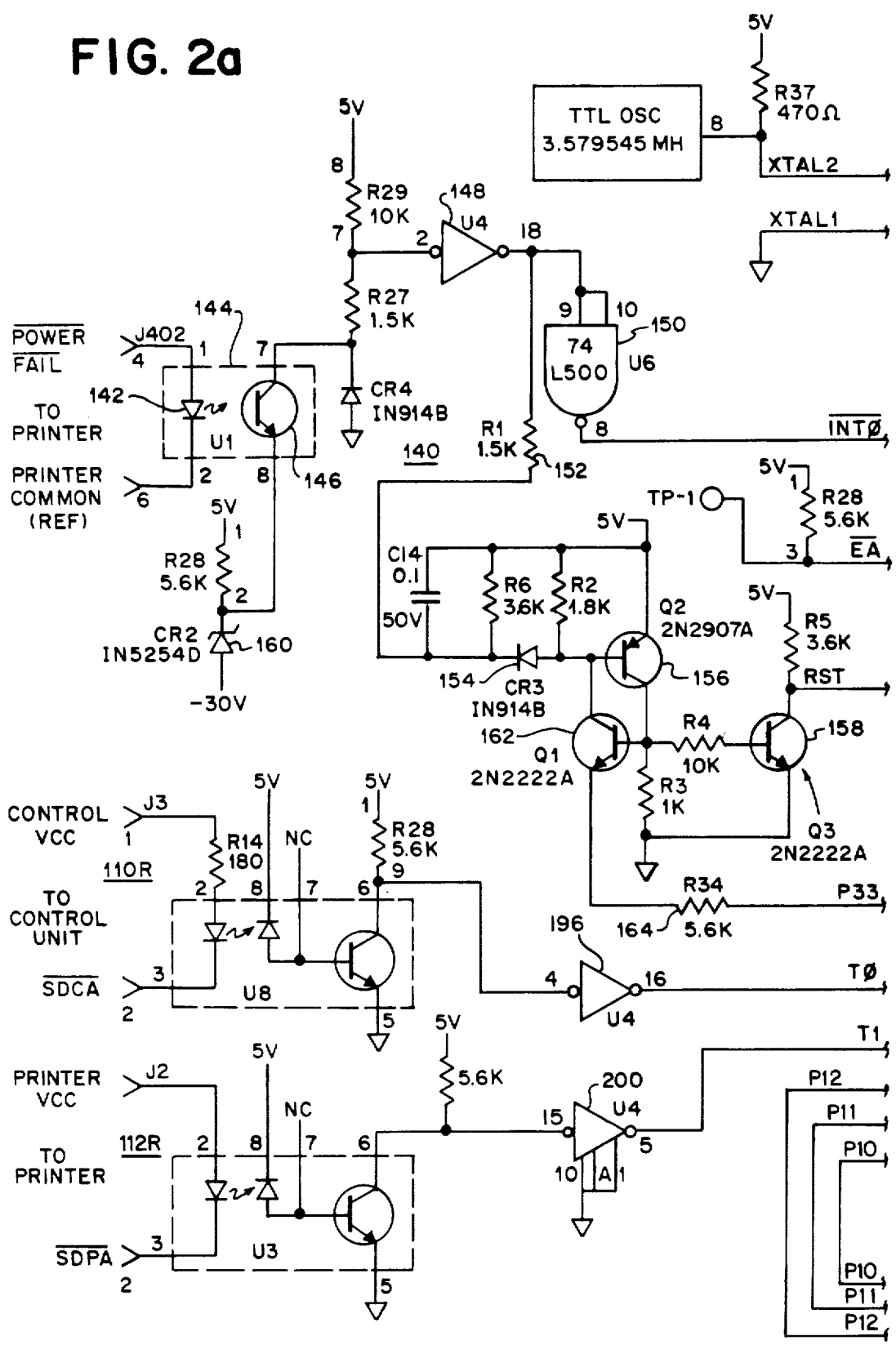
FIG. 2a is a detailed schematic diagram showing input circuitry for the microprocessor of the accounting system shown in FIG. 1.
Figure 2B:
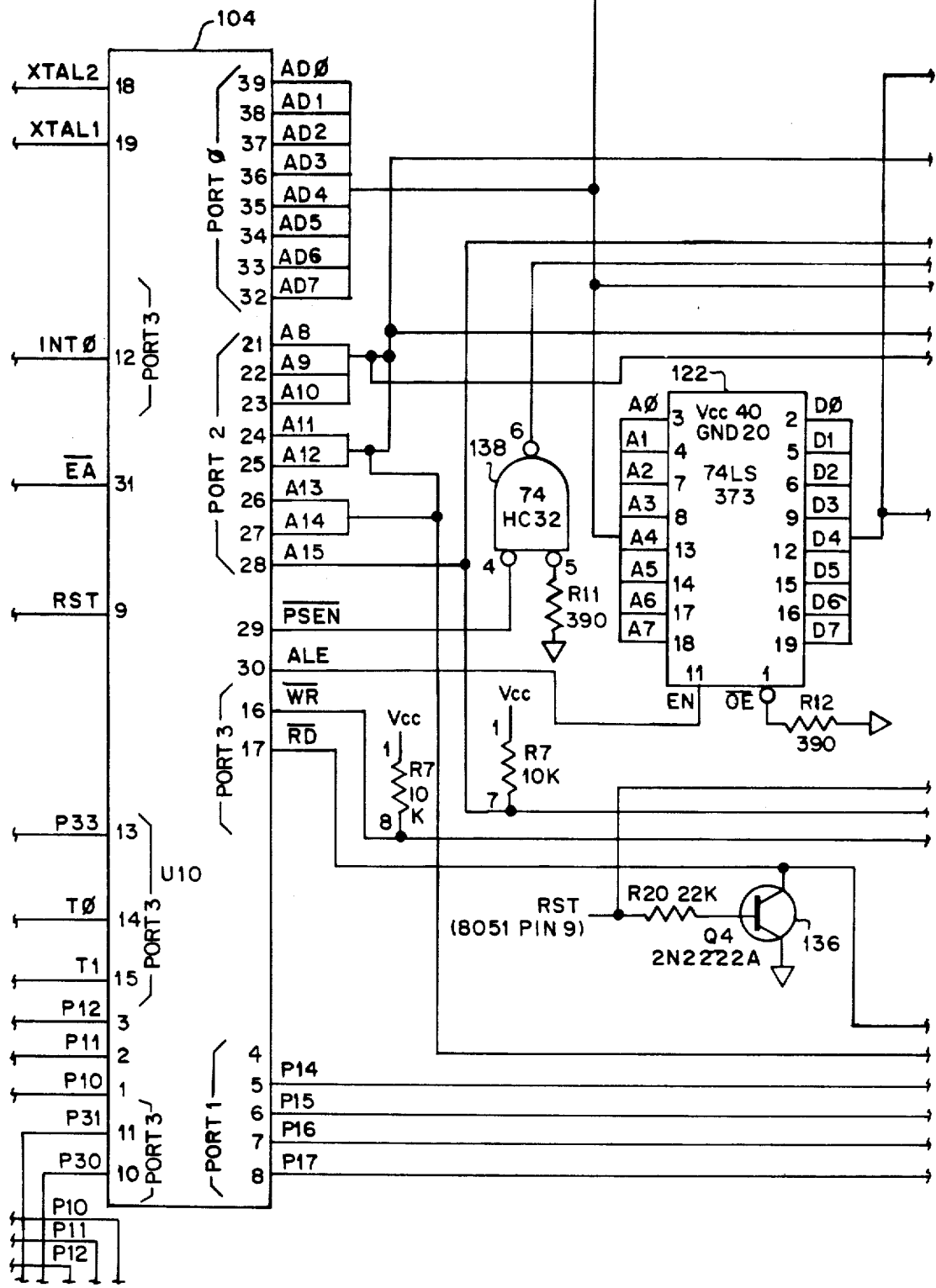
FIG. 2b is a detailed schematic diagram showing the microprocessor and some of the output circuitry, including an address latch, of the accounting system shown in FIG. 1.
Figure 2C:
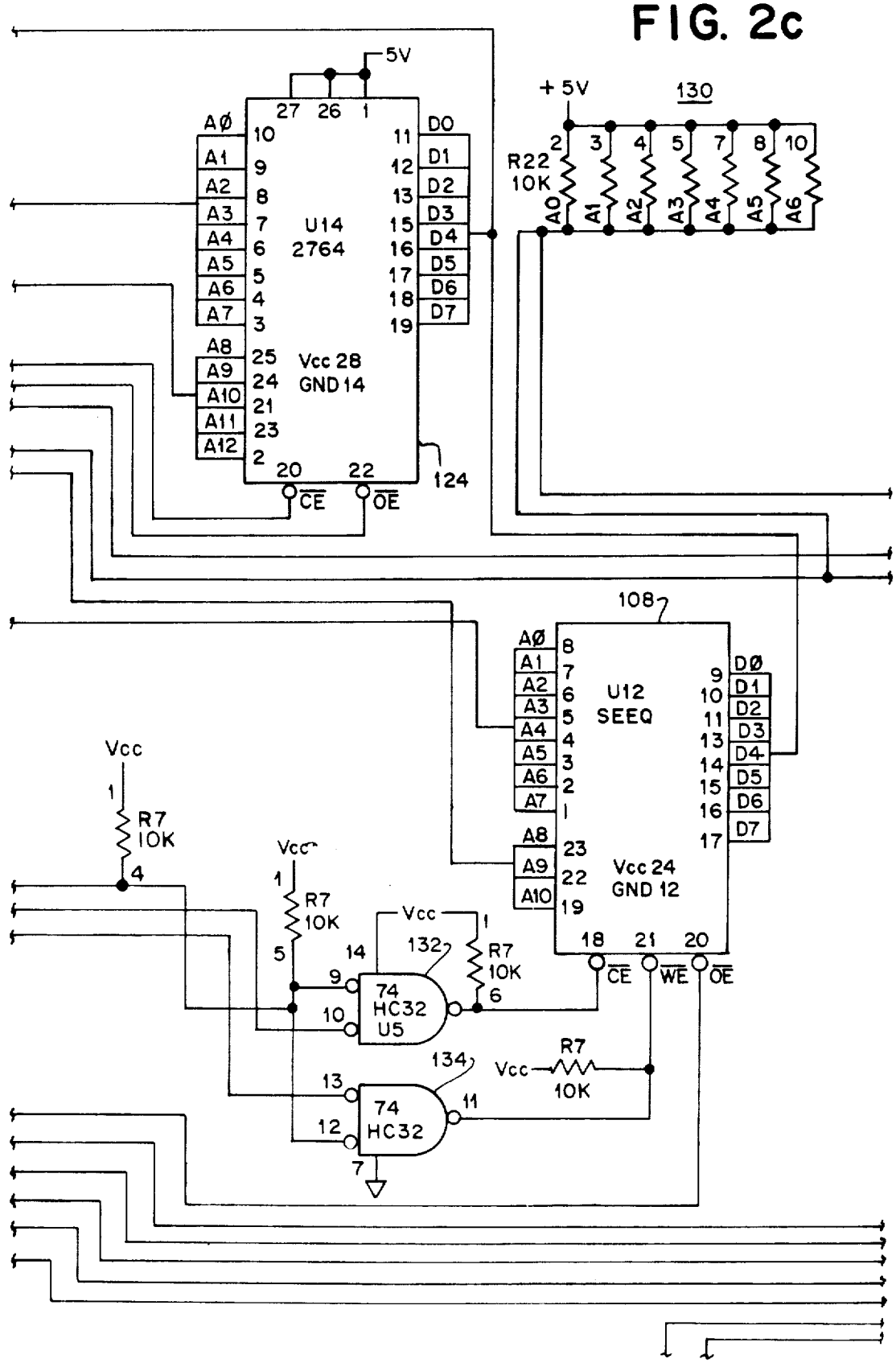
FIG. 2c is a detailed schematic diagram showing additional output circuitry of the accounting system shown in FIG. 1, including a PROM and a non-volatile memory.
Figure 2D:
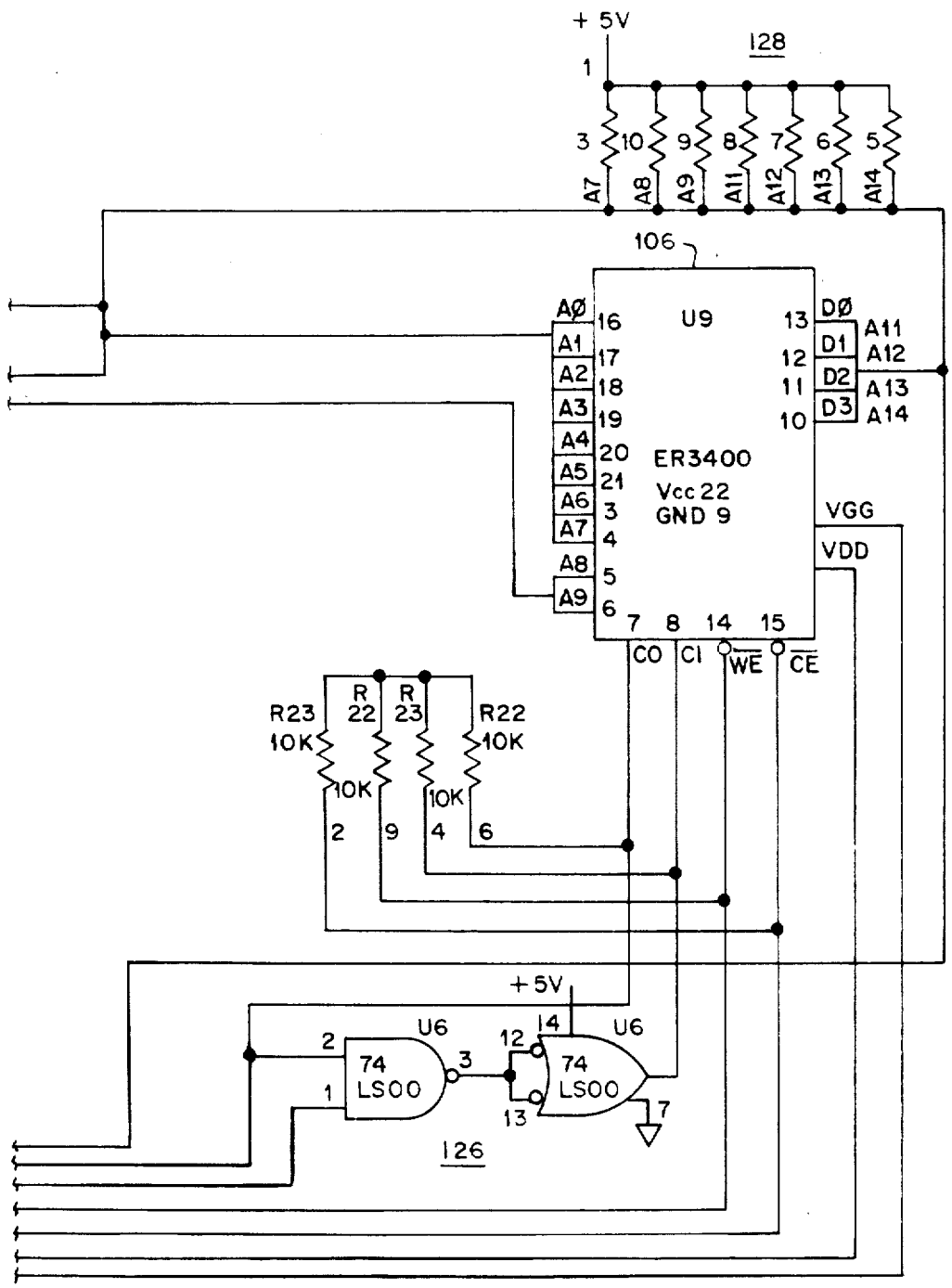
FIG. 2d is a detailed schematic diagram of further circuitry of the accounting system shown in FIG. 1, including another non-volatile memory.
Figure 2F:
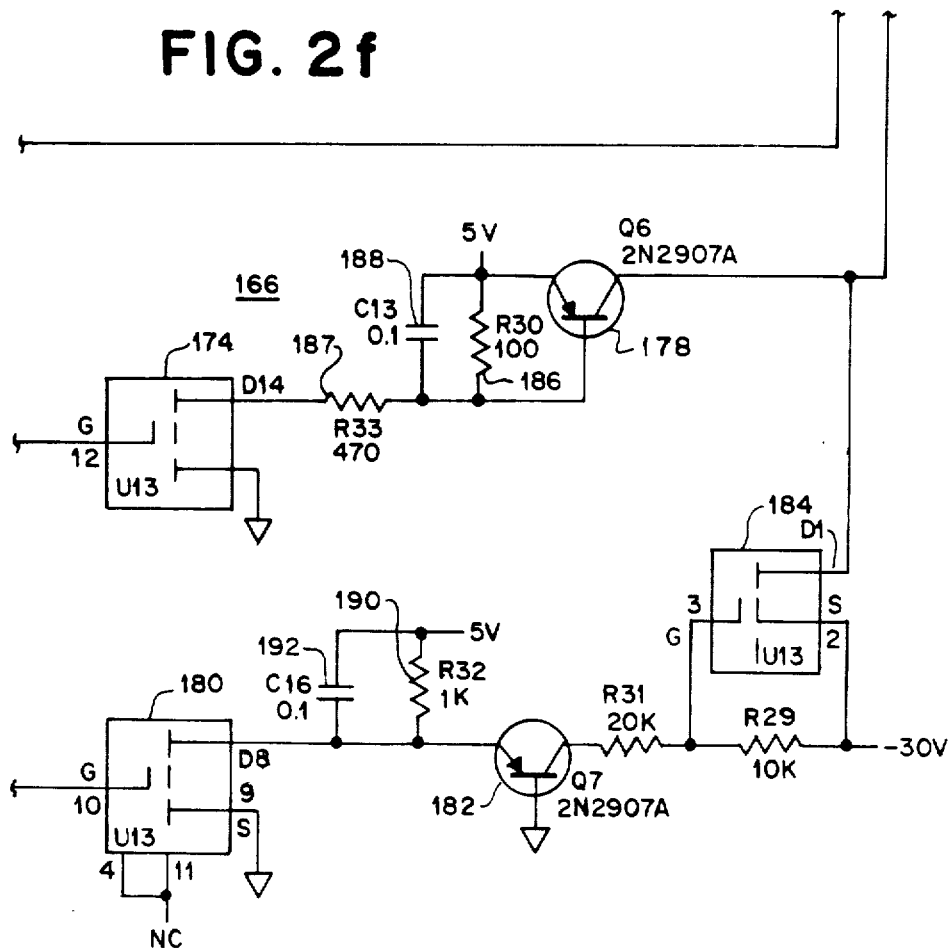
FIG. 2f is a detailed schematic diagram of yet further circuitry the accounting system shown in FIG. 1, including circuitry for coupling the microprocessor of FIG. 2b to the lift interposer and circuitry for coupling a minus 30 Volt d.c. supply to the microprocessor shown in FIG. 2b.
Figure 2F:
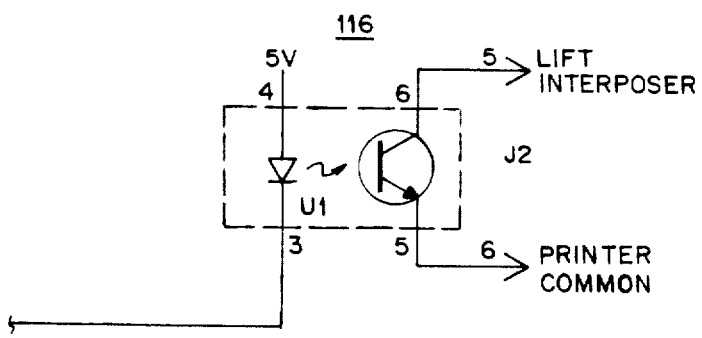

Reference is now made to FIG. 2. The accounting microcomputer 104 is connected to the two nonvolatile memories 106 and 108. The address ports of the EEPROM nonvolatile memory 108 are connected to the microcomputer 104 by way of an address latch 122. The higher order address ports A8, A9 and A10 are coupled directly to port 2 of the microcomputer 104. The data lines of the nonvolatile memory 108 are connected directly to the port "0" of the microcomputer 104 and additionally to an external PROM 124. The PROM 124 can serve as an extra program memory capability for the meters accounting circuit or alternatively as the source of a diagnostic program for testing faults or failures of the meter. The MNOS nonvolatile memory 106 address lines A0 through A7 are directly connected to the microcomputer 104 port 0. The higher order address bits A8 and A9 are connected to port 2 of the microcomputer 104. The four byte data input/output ports D0 through D3 are directly coupled to port 2 of the microcomputer.

The nonvolatile memory 106 has two control lines C0 and C1 which establish the operation to be performed, namely, read, write, or erase; a write enable port; and, a chip enable port. The two ports are connected to the higher order 2 pins of the port 1 of the microcomputer 104. The control lines C0 and C1 are operated from port 1 of the microcomputer 104 by means of a block erase inhibit circuit 126. This arrangement is described in detail in U.S. patent application Ser. No. 397,395, filed July 12, 1984, of Tom Germaine and Paul C. Kroll for SECURITY SYSTEM FOR USE WITH ELECTRONIC POSTAGE METER TO PREVENT BLOCK ERASURE OF DATA. The address and data lines of the nonvolatile memory 106 are connected to the +5 volt power supply by a series of pull up resistors 128 and 130 respectively. The pull up resistors in conjunction with the +5 volt power supply insure that the high level voltage at each port is above a predetermined level, such as +3.6 volts, so that the high level is above the specified threshold for the device.

The nonvolatile memory 108 includes three control terminals, a chip enable terminal, a write enable terminal, and an output enable terminal which are coupled to the microcomputer 104. The chip enable and write enable line are connected to the microcomputer through a circuit which includes two negative logic AND gates 132 and 134. Each of these gates will provide a low output upon the occurrence of two low inputs at their respect two input terminals. The devices 132 and 134 operate in conjunction with an NPN transistor 136 to protect the contents of the nonvolatile memory 108 upon the detection of the power fail of the operating voltage for the system. This circuitry operates in conjunction with circuitry within the nonvolatile memory to ensure that the nonvolatile memory 108 is in a known condition. When the operating voltage of the circuit falls below a predetermined level, but is yet above the level of voltage needed to cause the onboard protection circuitry of the memory 108 to become active which is 3 volts, the circuitry including devices 132, 134, and 136 provide suitable protection for the memory 108.

A negative AND gate 138 is provided for manufacturing testing purpose. One of the inputs to the gate 138 is connected to ground by a resistor to render the gate 138 essentially inoperative. When it is coupled to a high voltage, the negative ANDgate 138 functions to disable the device 124 data lines by rendering the output enable terminal of the device high.

A power fail and reset logic circuit 140 is provided. This circuitry functions to hold the microprocessor 104 in the reset mode until the voltages have risen sufficiently and stabilized. Additionally, on a power down occurrence when power fail is detected, the circuit functions to both insure that the reset signal is held off until an interrupt routine is initiated and completed. Thereafter, the circuit functions to insure positive application of a reset signal and the continued application of that signal as the power falls.

As power rises, and before the power rises to the level where it is stabilized, no current flows through the photodiode 142 of the opto-isolator 144. Thus, the opto-isolator output photo-transistor 146 is nonconductive. As a result, the output of the opto-isolator is maintained at a high level by the rising voltage at the +5 volt supply. This results in a hysteresis buffer 148 providing a high voltage output causing the NAND gate 150 to maintain an active signal on the interrupt terminal of the microcomputer 104. This causes no activity by the microprocessor because, as will be more explained below, the microprocessor is being maintained in the reset mode which overrides the interrupt signal. The high voltage at the output of the hysteresis buffer 148 is applied via a resistor 152 to back bias a diode 154 coupled to the base electrode of PNP transistor 156. This causes transistor 156 to be biased out of conduction which in turn causes NPN transistor 158 to be biased out of conduction. As a result, the reset terminal follows the voltage at the +5 volt power supply and is maintained active as power rises.

When power rises to a sufficient level and stabilizes, current begins to flow through the photodiode 142 and phototransistor 146 is biased into conduction. This causes the input voltage to the hysteresis buffer 148 to go low and its output, likewise, to go low. As a result, transistor 156 is biased into conduction causing transistor 158 to also be biased into conduction. This removes the reset signal from the microcomputer 104 and simultaneously removes the active interrupt signal applied by NAND gate 150.

When the phototransistor 146 is rendered nonconductive due either to a power fail detection signal which causes current to cease flowing through the photodiode 142 or a failure of the −30 volts applied causing the supply to rise toward ground, the interrupt line is rendered active. This occurs because the hysteresis buffer 148 has a high input applied resulting in a high output being applied to the NAND gate 150. As a consequence, a low output signal applied on the interrupt line and the microcomputer 104 under program control goes into an interrupt power down routine.

The microcomputer begins to operate under program control after the operating voltages reach their proper level and stabilize. The microcomputer continues to operate and execute main line meter program functions until a power fail occurs in either the input to the photodiode 142 where current ceases to flow or by a failure in the −30 volt supply coupled via the zener diode 160 to the emitter electrode of transistor 146. Either a failure of the power detect circuit or a rising voltage on the −30 volt supply causes phototransistor 146 to be biased out of conduction, biasing diode 154 out of conduction. Nevertheless, under program control, an NPN transistor 162 is maintained conductive until the necessary power down sequence has been completed. This occurs by having the emitter electrode of the transistor 162 connected through a resistor 164 to port 33. Transistor 156 continues to be maintained in conduction by connecting the base electrode to ground through the collector emitter current path of transistor 162 and port 33 of the microcomputer 104. Transistor 158 is maintained in conduction until the power down routine is completed and the voltage at port 33 goes high biasing transistor 162 out of conduction. When this occurs, transistor 156 is biased out of conduction. As a result, transistor 158 is biased out of conduction and the reset signal is applied on the reset line. The microcomputer 104 goes into the reset mode and remains in the mode as power falls.

A sequence control circuit 166 is provided for controlling the sequence of application of operating voltages to the MNOS memory 106. The MNOS memory, to properly operate, requires the sequenced application of three separate voltages. This is controlled by the sequence control circuit 166. On power up, a +5 volt operating voltage is applied to MNOS terminal 22, not shown. It should be noted that the +5 volts is applied to all of the various devices as the $V_{cc}$ and is not shown on the schematic circuit diagram as such. The +5 volt is generated when the power to the system is turned on. Thereafter, a −12 volt is applied to MNOS memory 106 pin 2 $V_{dd}$. The −12 volts is applied by microcomputer 104 under software control. Specifically, port 30 goes low biasing PNP transistor 168 into conduction. As the voltage rises on the transistor collector electrode, a MOS FET transistor 170 is biased into conduction. As a result the −12 volts applied to the MOS FET source electrode is coupled via the device channel to the memory 106 terminal 2. A resistor 172 connects the terminal 2 to ground to provide a static discharge path and protect the device.

When the system is turned on, and while the −12 volts is being established at terminal 2 of memory 106, a MOS field FET transistor 174 having its gate electrode connected to microcomputer port 31, is biased into conduction by the +5 volts applied via resistor 176 to its gate electrode. As a result, PNP transistor 178 is biased into conduction and a +5 volts is applied to memory 106 terminal 1, $V_{gg}$. This is because the ER3400 device requires the application of a +5 or a −30 volts on this particular terminal to avoid an undefined condition within the device which could adversely affect the memory operation, such as latch up which would prevent accessing memory locations. When the −12 volts has been applied to the MNOS nonvolatile memory 106 terminal 2, the +5 volts is removed from port 31 by microcomputer 104 causing port 31 to go low. The program control of microcomputer 104 will allow port 31 to change from its high condition to its low condition only after certain routines are completed to insure that it is desired to effectuate a write operation to MNOS nonvolatile memory 106 to change a memory location content. When this condition occurs, as previously noted, port 31 goes low which biases MOS FET transistor 174 out of conduction, causing PNP transistor 178 to be biased out of conduction and thereby removing the application of the +5 volts from the memory terminal 1. Simultaneously, a MOS FET transistor 180 is biased out of conduction which in turn biases a PNP transistor 182 into conduction. When transistor 182 is rendered conductive, it in turn biases a MOS FET transistor 184 into conduction which results in the application of a −30 volts through the drain source electrode channel to MNOS nonvolatile memory 106 terminal 1. When this sequence has been completed, the microcomputer 104 is able to access and write into memory locations within the nonvolatile memory 106.

After a write operation has been completed, the port 31 is put in a high state and the FET MOS 184 is biased out of conduction removing the −30 volts and the PNP transistor 178 is biased into conduction applying the +5 volts to the terminal 1. Resistors 186 and 187 in conjunction with capacitor 188 coupled to transistor 178, and resistor 190 and capacitor 192 coupled to transistor 182 function to provide a hysteresis effect. The values of these components are selected such that both devices cannot be operative to apply voltages to the terminal at the same time. Thus, each device goes off removing its respective voltage from terminal 1 before the other device turns on to apply its voltage to terminal 1.

Communications between the printer microcomputer, control module microcomputer and interposer are by means of optical isolators in conjunction with a hysteresis buffer. Thus, the opto-isolator 116 is coupled by hysteresis buffer 194 to port 12 of microcomputer 104. It should be noted that this is a one way serial communication channel from the microcomputer 104 to the interposer control. The control module communications to the microcomputer is by way of opto-isolator 110R and hysteresis buffer 196 to the T0 terminal of microcomputer 104. Control module communications from microcomputer 104 is by way of hysteresis buffer 198 and opto-isolator 110T. Finally, communications from the printer microcomputer is by way of opto-isolator 112R and hysteresis buffer 200 with communications from microcomputer 104 to the printer microcomputer by way of hysteresis buffer 201 connected to port 11 and opto-isolator 112T.

It should be noted that the low order pins of microcomputer 104 port 2 are connected to the high order address pins of both nonvolatile MNOS memory 106 and EEPROM memory 108. The higher order pins of port 2 are used as the data ports of microcomputer 104 for nonvolatile memory MNOS 106. When the EEPROM 108 is accessed for writing or reading purposes, the microcomputer 104 must output a 16 bit address, the software selects the address of the EEPROM memory 108 in such a way that the data input pins of the memory 106 are at a high level. Consequently, if noise inadvertently occurs on the control lines (write enable, chip enable, C0 and C1) which would otherwise condition memory MNOS 106 to have data written into it, the memory is still protected against overwriting because writing a 1 to a 0 in the ER3400 type nonvolatile memory would not enable an overwriting of the data into a 1. For those locations where a 1 exists already, the writing has no effect.

Additionally, because of the particular architecture of the present system, a high degree of isolation exists between the circuitry employed for reading and writing into each of the nonvolatile memories 106 and 108. Specifically, only 10 address lines are shared between the two nonvolatile memories 106 and 108. Namely, microcomputer 104 port 0 terminals P00 through P07 are shared by devices by memories 106 and 108 as well as external program memory 124. Additionally, port 2 terminals P20 and 21 (address A8 and A9) are connected to the high order address pins of the three memory devices 106, 108 and 124. Additionally in port 2, terminals A11, A12, A13, and A14 are connected to the data lines of nonvolatile memory 106. Finally, port 2 terminal A15 is coupled to control the chip enable lines of devices 108 and 124.

It should expressly be noted that when program from external program memory 124 is being utilized to control operation of the microcomputer 104 the particular systems configuration provides maximum protection for nonvolatile memory 106 in a manner similar to that provided when operating nonvolatile memory 108.

As will be further explained in connection with the description of the flow charts, the access to the nonvolatile memories 106 and 108 is accomplished by different microprocessor instructions. The access to the MNOS nonvolatile memory 106 is by input/output mapping techniques. In contrast, access to the EEPROM nonvolatile memory 108 is by memory mapping techniques. By utilizing two different accessing techniques which flows from the particular hardware architecture configuration rather than the inherent addressing and accessing techniques of the device themselves, further protection is provided against inadvertently accessing the wrong memory or a wrong address while executing rewrite instructions to a particular memory. Thus, it should be recognized that the two memories are not each accessed, as for example, by memory mapping each having different ranges where an inadvertent use of address in the wrong range could cause access to the wrong memory. Again, both memories are not accessed by input/output mapping where again a wrong input or output address instruction could access a wrong memory. This is because memory mapping access instructions activate microcomputer 104 write lines and read line (terminals 16 and 17). However these lines are connected only to EEPROM nonvolatile memory 108 and not to MNOS memory 106. The I/O map instructions are effectuated by the high order pins of port 1 of microcomputer 104 (terminals 5, 6, 7, and 8) which are only connected to the nonvolatile memory 106.

Postage Meter Sequence of Operation

FIGS. 3 through 18 are flow charts representing the sequence of operation of the postage meter accounting system 100.

Figure 3:
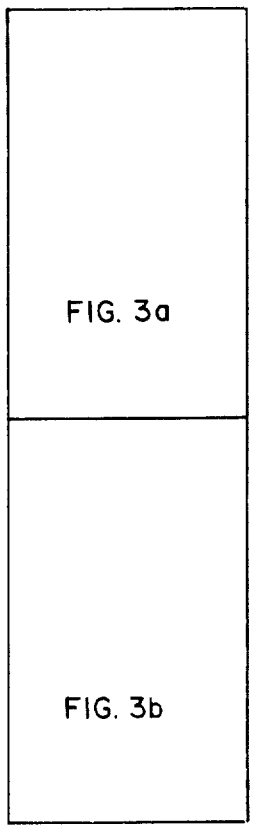
FIG. 3 is a schematic diagram showing the manner in which the details of flow charts of FIGS. 3a and 3b are interconnected to each other for showing the detailed circuitry of the accounting module main line loop.

Reference is made to FIG. 3, the accounting module main line loop. The flow chart depicts operation of the accounting unit 100 after the power up routine has been completed. It reflects the regular operation of the accounting module. It should be particularly noted that the operation involves receiving and processing the printer status and, in response thereto writing two trip records to the EEPROM memory 108. Additionally, when this occurs it sets a trip flag. When the operation of the microprocessor 104 is caused to loop back to the main line program loop and continues its processing it will reach a decision block concerning whether the trip flag has been set. If the trip flag has been set, it clears the flag and verifies/rewrite the trip records. Specifically, it verifies that the trip record was written correctly and if not correctly written, attempts to rewrite the data into the memory locations. It should be noted that the MNOS memory 106 is written into only during power down (see FIG. 18). Additionally, the MNOS nonvolatile memory 106 is updated during a switching of the postage meter between its normal and service mode, should that occur.

Figure 4:
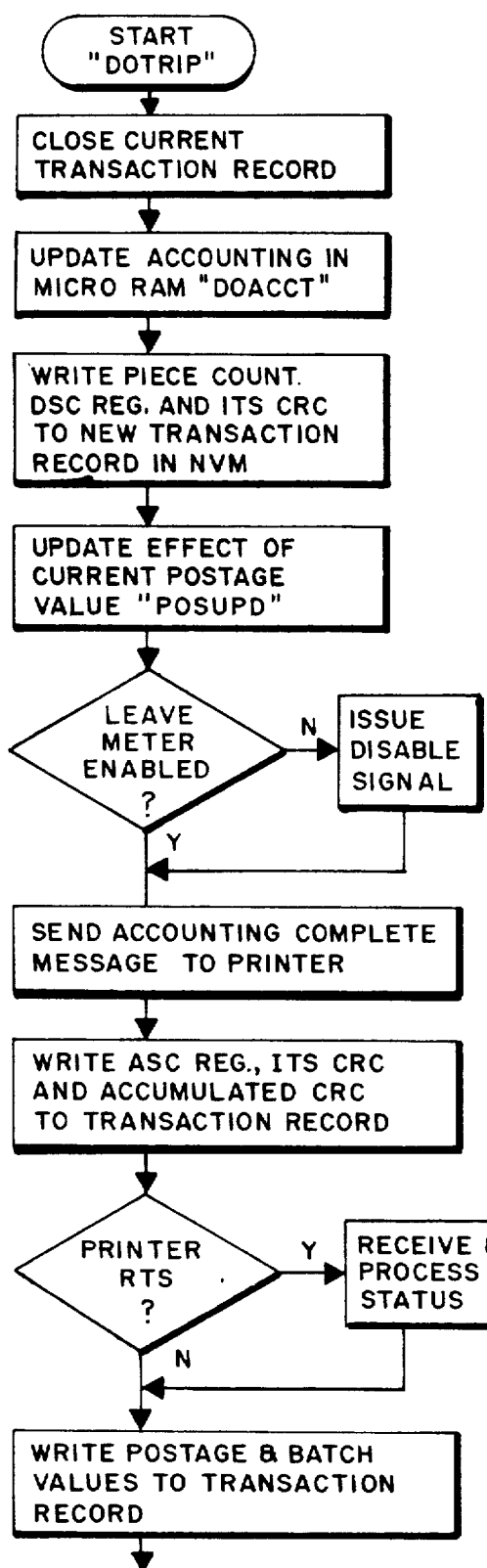
FIG. 4 is a flow chart showing the accounting module trip processing.
Figure 4:
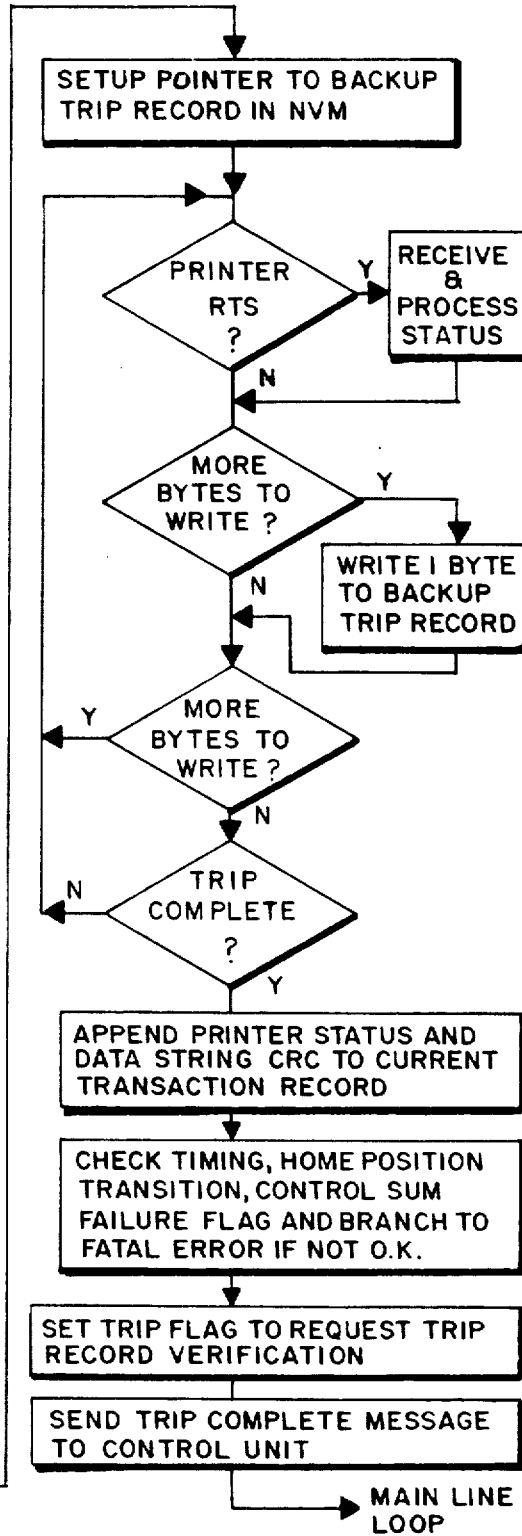

Reference is now made to FIG. 4, the accounting module trip processing. The flow chart depicts the manner in which the writing to the EEPROM nonvolatile memory 108 is achieved.

When a postage imprint or dispensation is detected, the accounting microprocessor 104 performs, under the program control, the following tasks. It writes the right most two digits of the unincremented piece count (count of the number of pieces processed during an operation of the meter) as a "header" to "close" the previous transaction record. It also sets the trip flag in the meter status. Additionally, the microcomputer 104 updates the accounting data in the microprocessor RAM and performs a control sum test. The control sum is the sum of the ascending register and descending register of the postage meter which should equal the control sum.

Additionally, the microcomputer 104 writes portion of the current logical transaction record, which includes the piece count, the CRC of the descending register and the descending register value. A partial CRC for the data string is accumulated and stored in a temporary RAM location. The microcomputer 104 under program control sends the accounting complete message to the printer module. It further writes the CRC of the ascending register, the ascending register value and the CRC of the data string from the piece count to the ascending register. It goes to receive and process the new status if the printer module raises the request to send signal. The communications protocol for the various modules is described fully in the above noted U.S. Pat. No. 4,301,507.

The microcomputer 104 writes to the current transaction record the postage value, batch amount, batch count and PIN (parcel identification number), if it is a parcel register rather than postage meter. It continues accumulating the data string CRC.

The program causes the microcomputer 104 to save the last memory address of the primary full trip record onto the stack. It proceeds to write the back up (or abbreviated) trip record in a byte by byte manner so that a request to send from the printer can be served immediately. After writing the back up trip record, the microcomputer 104 waits until the trip bit in the printer status is cleared, then retrieves, (pops) the memory address of the primary trip record from the stack and writes the new printer status and the CRC for the data string of the entire primary trip record. The microcomputer 104 checks the home position change and the synchronization between the home position and the piece count for an error code condition. This is to determine if the meter is operating properly. The microcomputer sets a trip flag which effectively requests later trip record verification. It then sends the meter status with trip completed bit set to the control unit. The trip bit will be cleared if the outgoing transmission is successful. After this is achieved, the program would return to the main line loop.

It should be noted that the postage value stored in each primary trip record is used only for reconstructing the postage fund in case a catastrophic memory failure occurs and the meter is taken out of service. It is used by the service department in analyzing the data dumped from a returned meter. During the power-up loading onto the temporary RAM, the postage value read from the primary trip record is overwritten by the postage setting value read from the postage ring buffer which always contains the current postage setting value. Thus, if the setting value is changed after a trip, the current setting rather than the last trip setting is loaded into the microcomputer random access memory.

Figure 5:
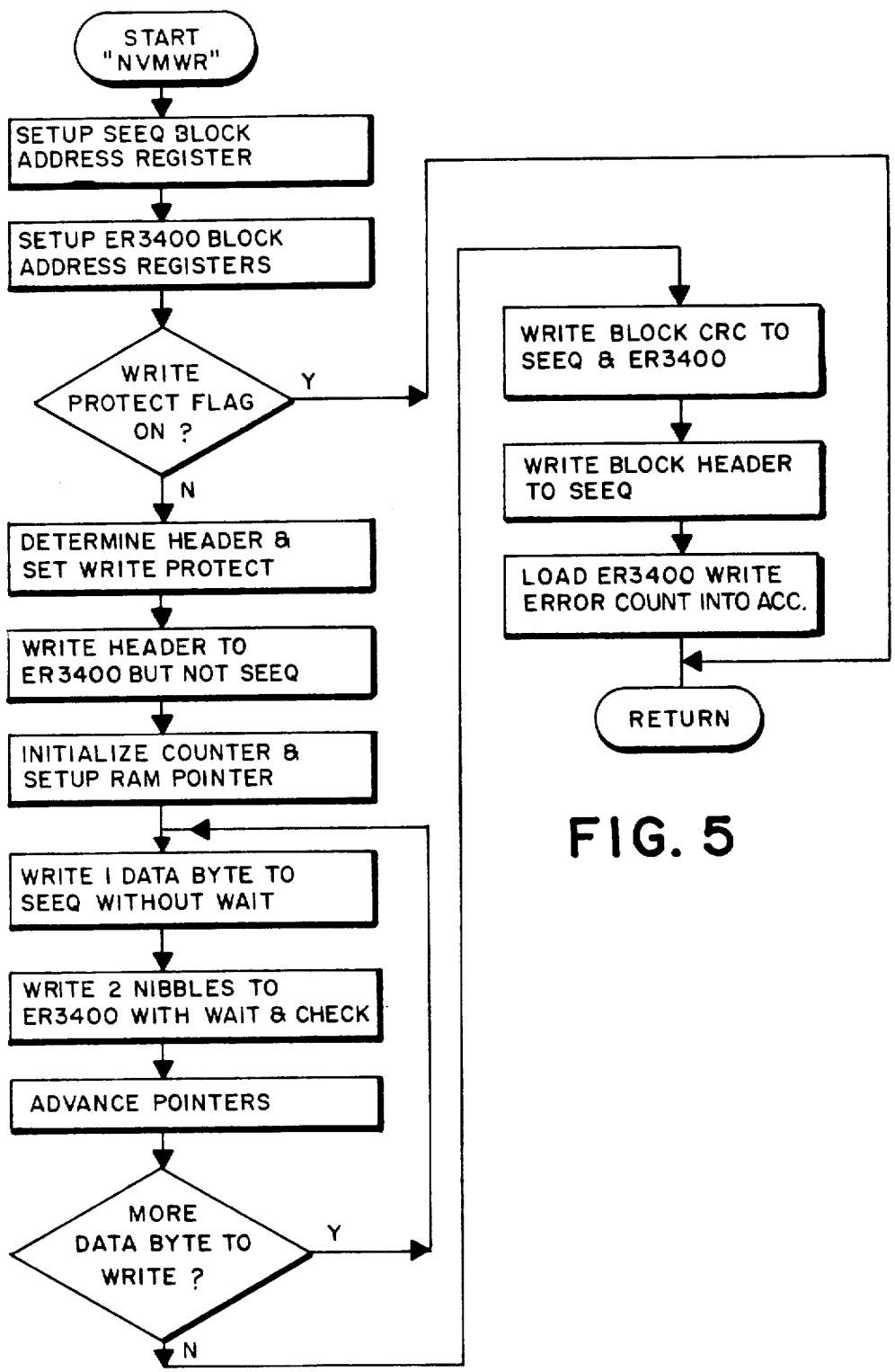
FIG. 5 is a flow chart showing the nonvolatile memory block write routine.

Reference is now made to FIG. 5, the nonvolatile memory block write routine. The routine is called when it is desired to write into a block of the EEPROM nonvolatile memory 106 and MNOS nonvolatile memory 108. This occurs only during the power down of the module or when the meter mode is switched from the normal mode to the service mode by actuation of the service switch disclosed in U.S. Pat. No. 4,301,507. It should be noted that the program causes the microcomputer 104 to write one data byte to the EEPROM nonvolatile memory 106 without waiting. It immediately writes two nibbles or four bits to the MNOS nonvolatile memory 108 with wait and check, that is, to read back and verify that the data desired to be written into the memory locations has in fact been written.

Since a power down interruption can occur at any time, it is possible that it may be required to write information into both nonvolatile memories 106 and 108 should a power interruption occur. To avoid the possibility that a write operation has occurred within the prior two milliseconds into the EEPROM nonvolatile memory 106, the nonvolatile memory block write routine has been arranged such that writing to the EEPROM nonvolatile memory 106 does not occur until the processing loop has operated for at least two milliseconds. Thus, the first write data to the EEPROM nonvolatile memory 106 occurs only after the writing of the header to MNOS nonvolatile memory 108. Since this is a two nibble header it takes more than two milliseconds to accomplish the write cycle.

Figure 6:
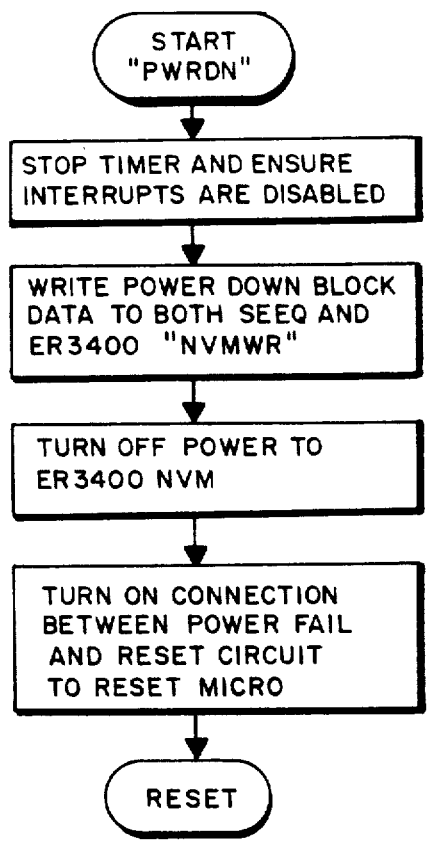
FIG. 6 is a flow chart showing the power down processing routine.
Figure 7A:
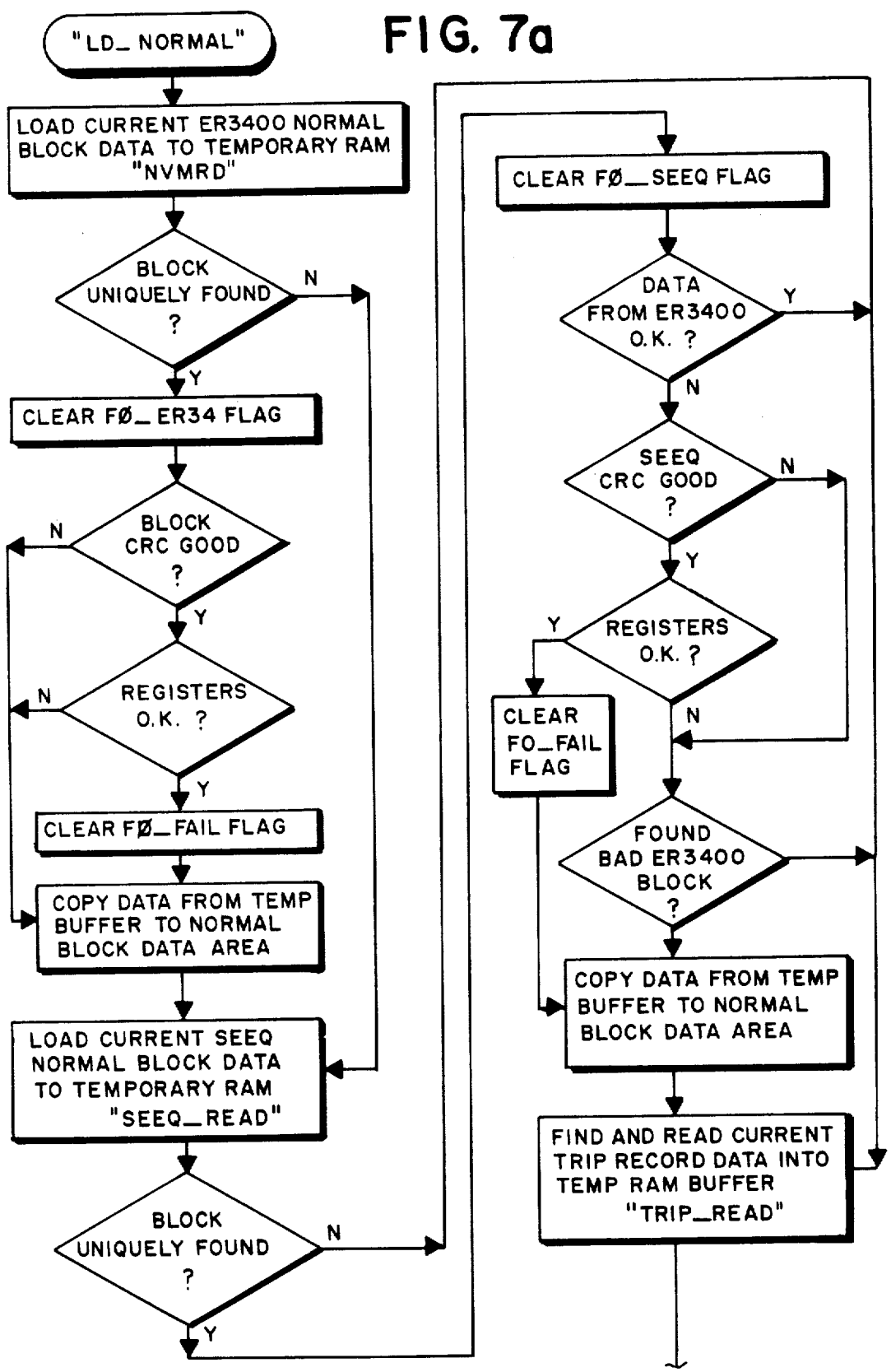
FIG. 7a is a portion of the flow chart showing the routine of FIG. 7.
Figure 7B:
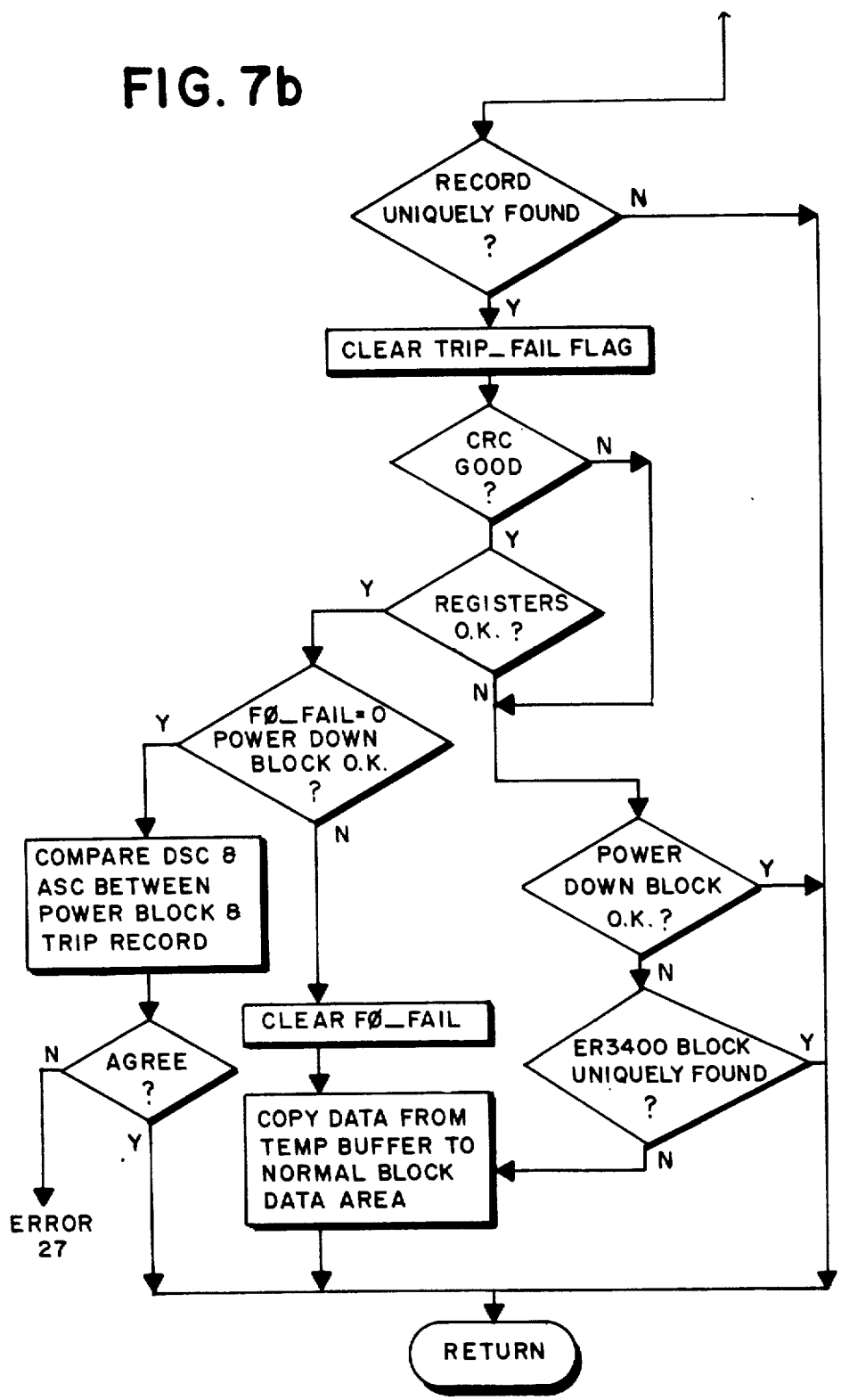
FIG. 7b is the remainder of the flow chart showing the routine of FIG. 7.

Reference is now made to FIG. 6, the power down processing routine. The routine shows the processing of the accounting unit 100 when a power down situation is encountered. It should be noted that when the nonvolatile memory blocks are completely written the routine turns on the connection between the power fail and reset circuitry to the microcomputer 104 by causing microcomputer port 33 to go low to operate the circuitry as previously described.

Figure 7:
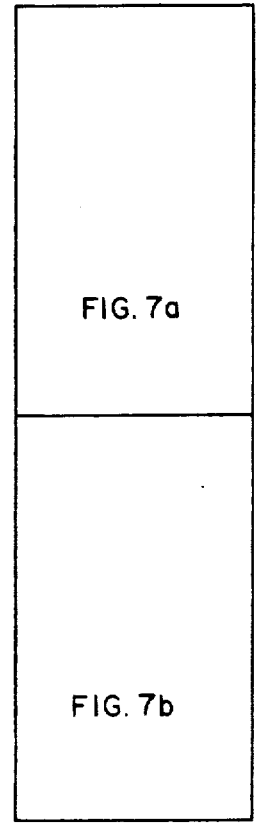
FIG. 7 is a schematic diagram showing the manner in which the detailed circuit showing the load normal block data routine are indicated.
Figure 3A:
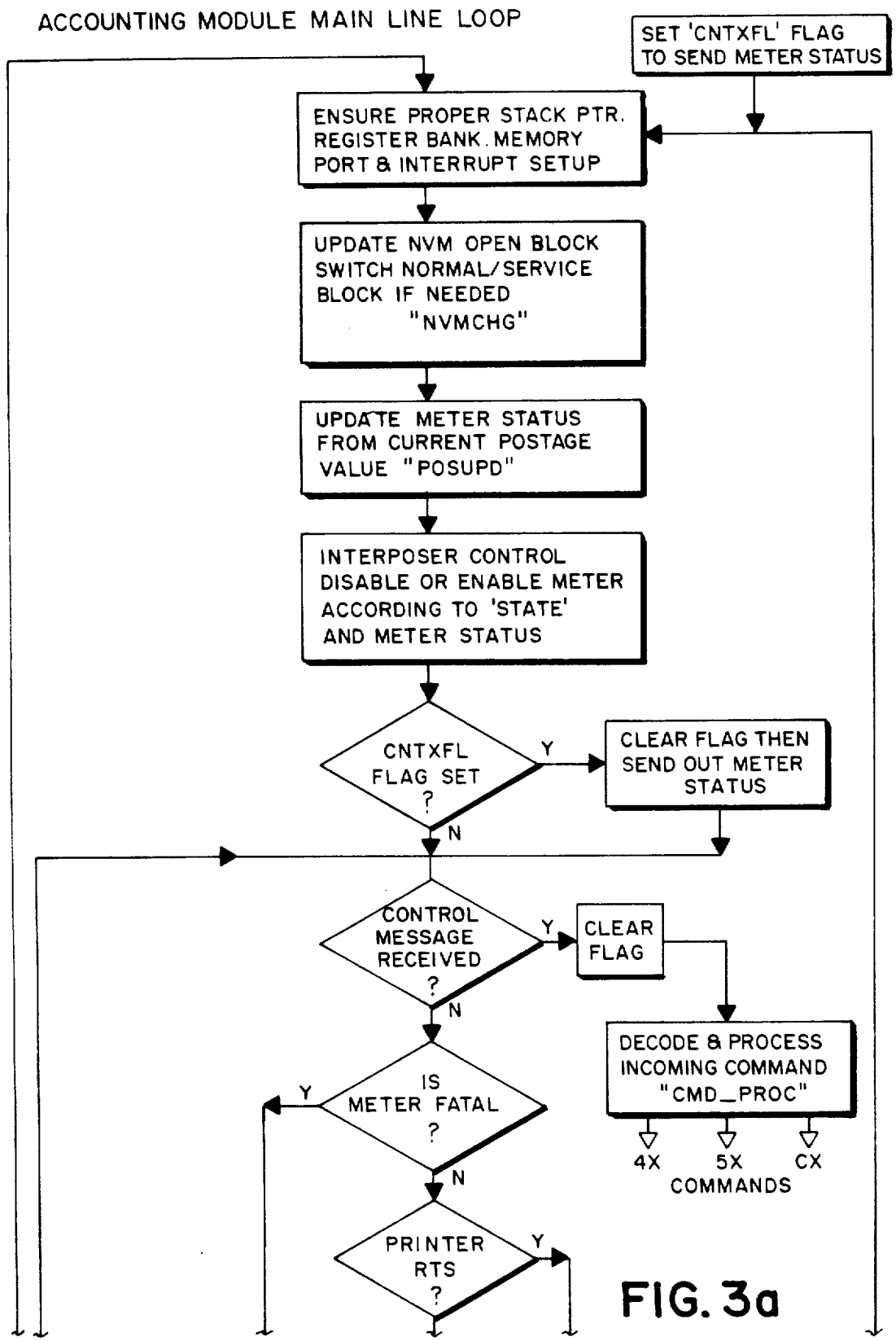
FIG. 3a is a portion of the flow chart referred to in FIG. 3.
Figure 3B:
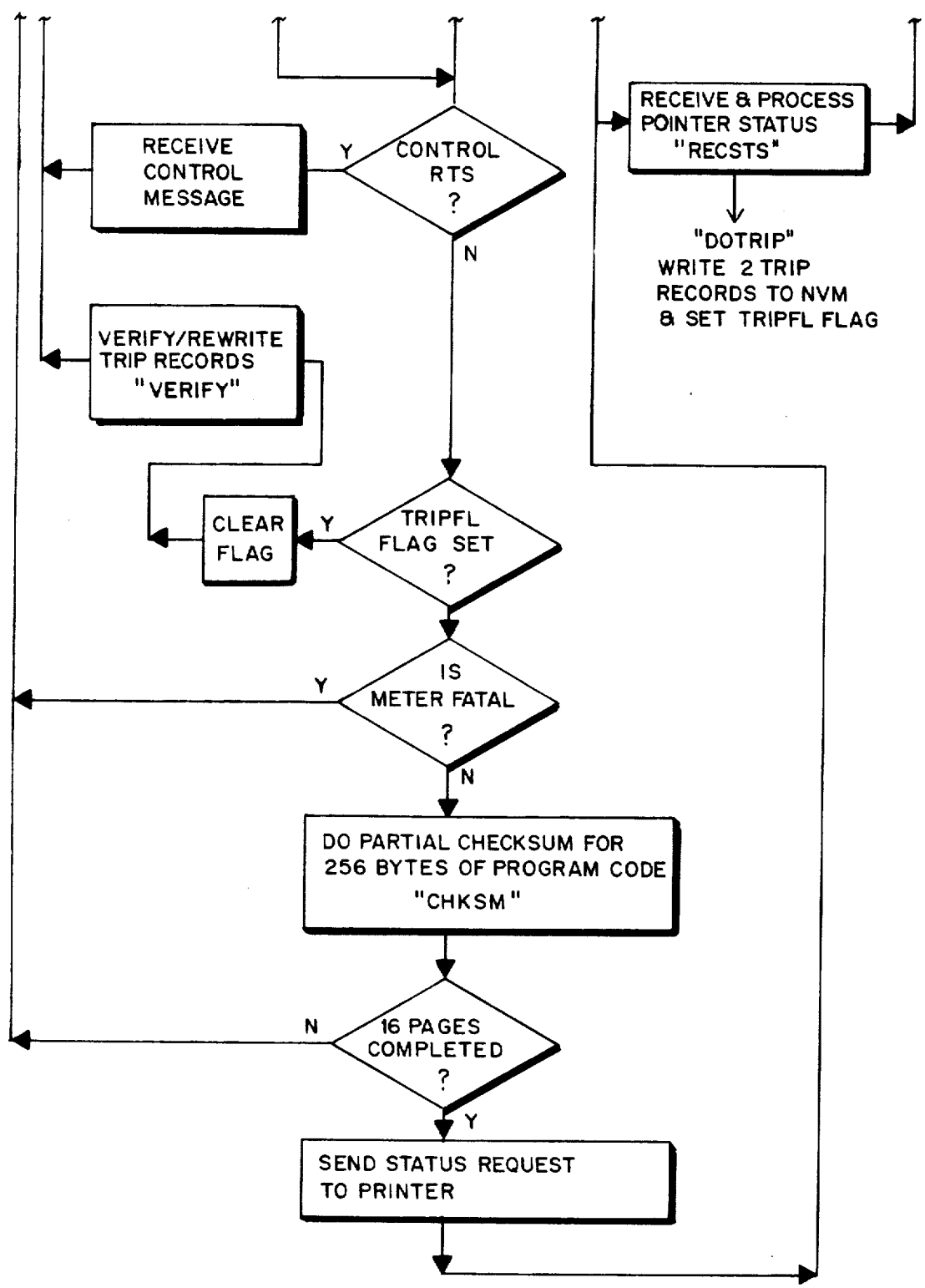
FIG. 3b is the remainder of the flow chart shown in FIG. 3.

Reference is now made to FIG. 7, the load normal block data routine. The routine describes the operation of the microcomputer 104 to transfer the data stored in the nonvolatile memories into the microcomputer random access memory. This occurs during the power up of the accounting unit 100. It should be noted that the source of data for the random access memory comes from several locations. The data comes from the normal block data in the MNOS memory 108 it also comes from the current EEPROM nonvolatile memory 106 normal block data and lastly, it comes from the current trip record data from the EEPROM nonvolatile memory 106. It should be noted that the data obtained from these three locations are compared to make sure that they are consistent. If the data is not consistent an error message is provided which causes the power up routine to be aborted. Until the condition is resolved the meter will not enable and cannot be utilized.

Figure 8:
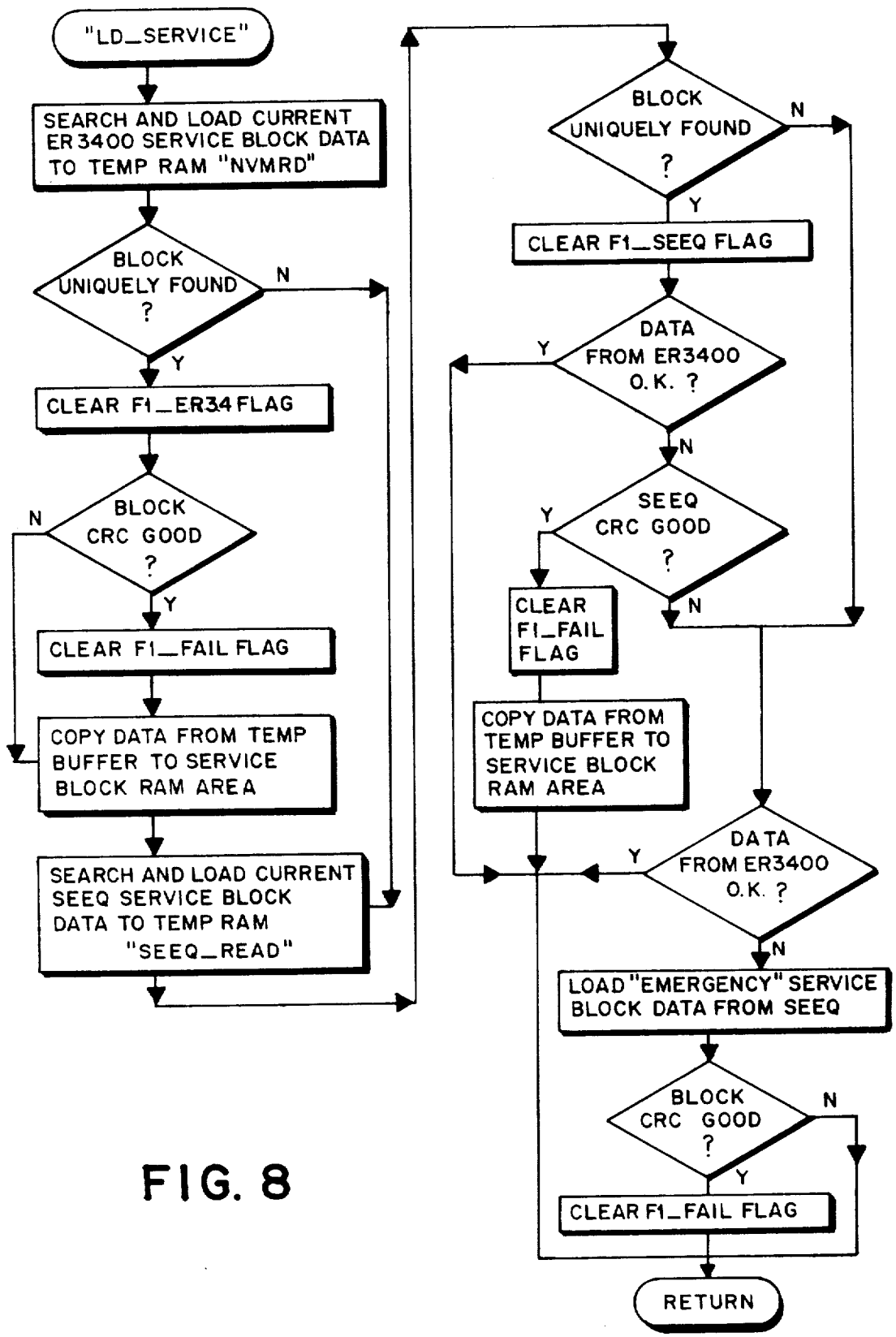
FIG. 8 is a flow chart showing the load service block data from the MNOS or EEPROM memories.

Reference is now made to FIG. 8, the load service block data from MNOS or EEPROM memories. The service block data contains service and other meter related data needed to operate the meter such as the high dollar unlock, low postage warning and other similar types of information. The loading of the service block data operates in a manner similar to the loading of the normal block data; however, the comparison routines are not implemented due to the fact that this data is not as critical to meter operation as is the basic normal accounting information concerning postal funding.

Figure 9:
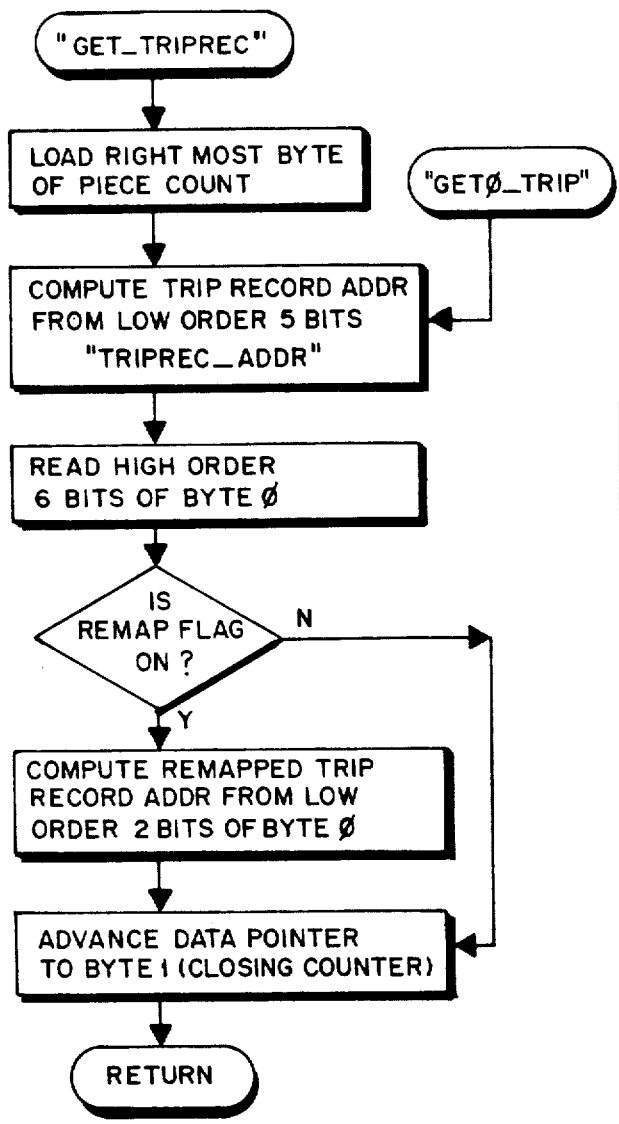
FIG. 9 is a flow chart showing computing trip record address routine.

Reference is now made to FIG. 9, the computing trip record address routine. This routine computes the trip record address for the EEPROM nonvolatile memory 108 so that the microcomputer 104 will write each trip into the proper location.

Figure 10:
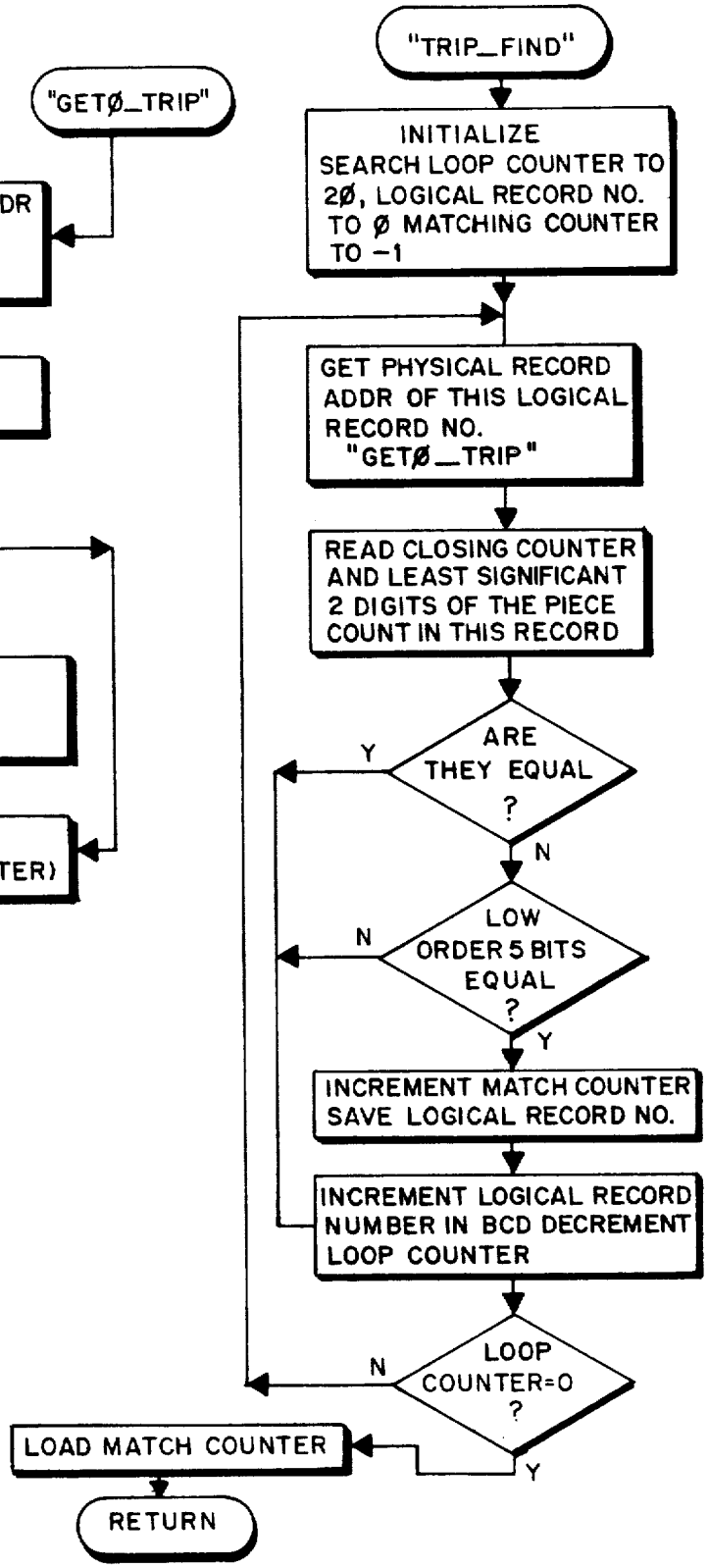
FIG. 10 is a flow chart showing find current trip record routine.

Reference is now made to FIG. 10, the find current trip record routine. This routine provides the ability to locate the current trip record rapidly during the power up process or responding to a request of the descending register stored in the EEPROM nonvolatile memory 108. Normally, the current trip record has the highest piece count value. Instead of comparing the 8 digit piece count value among the 20 trip records retained in the nonvolatile memory 108, the routine compares the "header" against the least significant two digits of the piece count for each of the 20 trip records. The trip record headers were written in real time by the accounting module trip processing routine previously discussed for FIG. 4. For the non-current trip records, the header value is equal to the piece count value modulo 100. For the current trip record, the header value is different by 20. This is because the header has not been updated and it still has the piece count value (modulo 100) of 20 transactions ago. Note that the current trip record is not identified by a header of a particular fixed value. In a fixed value header scheme, it is necessary to write the header twice, once when the record is current and secondly to change it to a different value to indicate that it is no longer current. This would cause the header locations to wear out before other data area in the nonvolatile memory with limited write cycle endurance. The technique described above avoids the difficulty.

Figure 11:
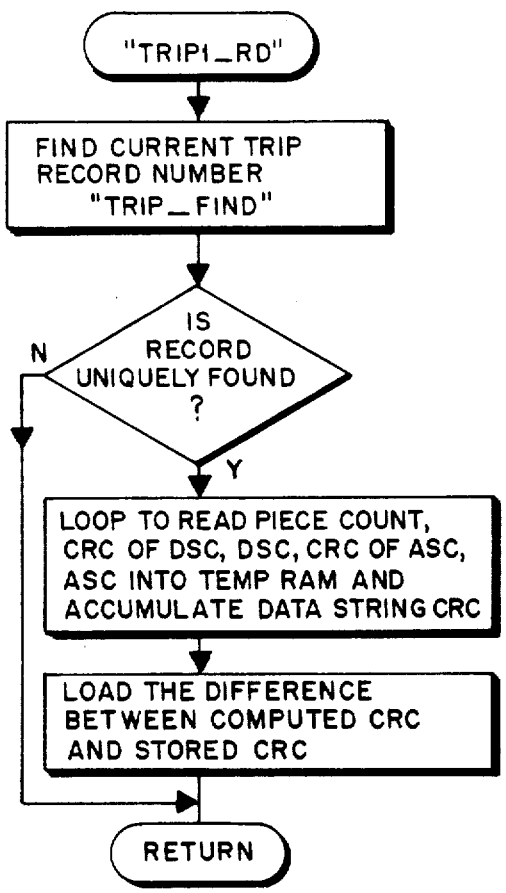
FIG. 11 is a flow chart showing read first portion of current primary trip record routine.

Reference is now made to FIG. 11, read first portion of primary trip record routine. The routine is used to insure that the real time trip record is consistent with the normal block data stored during power up routine.

Figure 12:
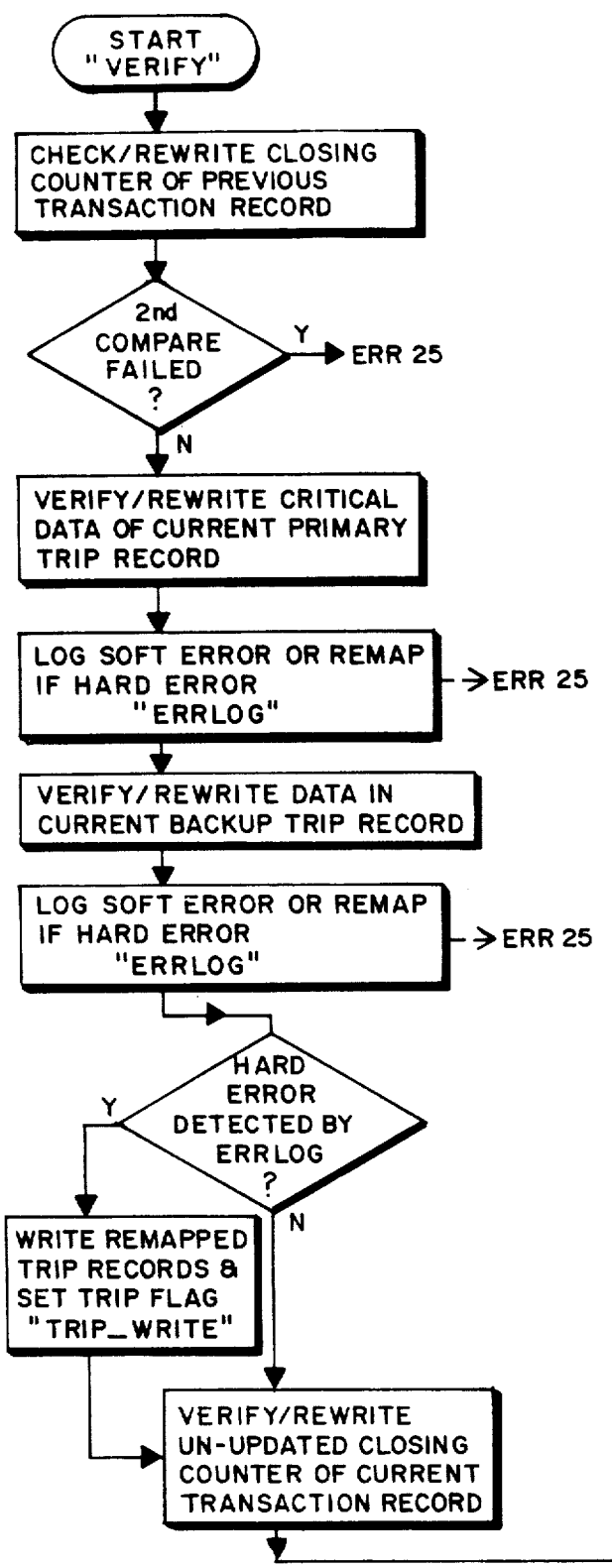
FIG. 12 is a flow chart showing the trip record verification routine.
Figure 12:
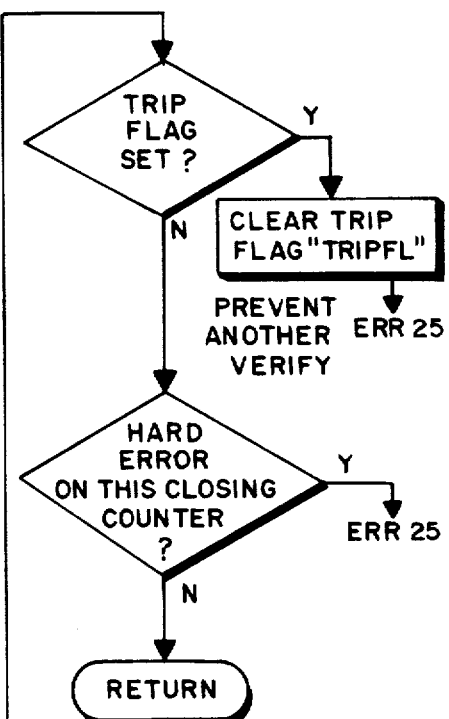

Reference is now made to FIG. 12, trip record verification routine. This routine verifies the accuracy of the critical portions of the primary and back up trip record. The critical portions are the piece count ascending and descending register values. If it is determined upon the verification that a trip record is bad an attempt is made to rewrite the data into the same location. If this fails, the record is rendered inoperative and a new record is written in another location reserved for such contingencies. The location of the record is remapped to the reserved locations. The remapping can also occur even if the rewriting to the original location is successful but the number of attempts to achieve the correct data write is more than a predetermined number such as nine attempts.

Figure 13:
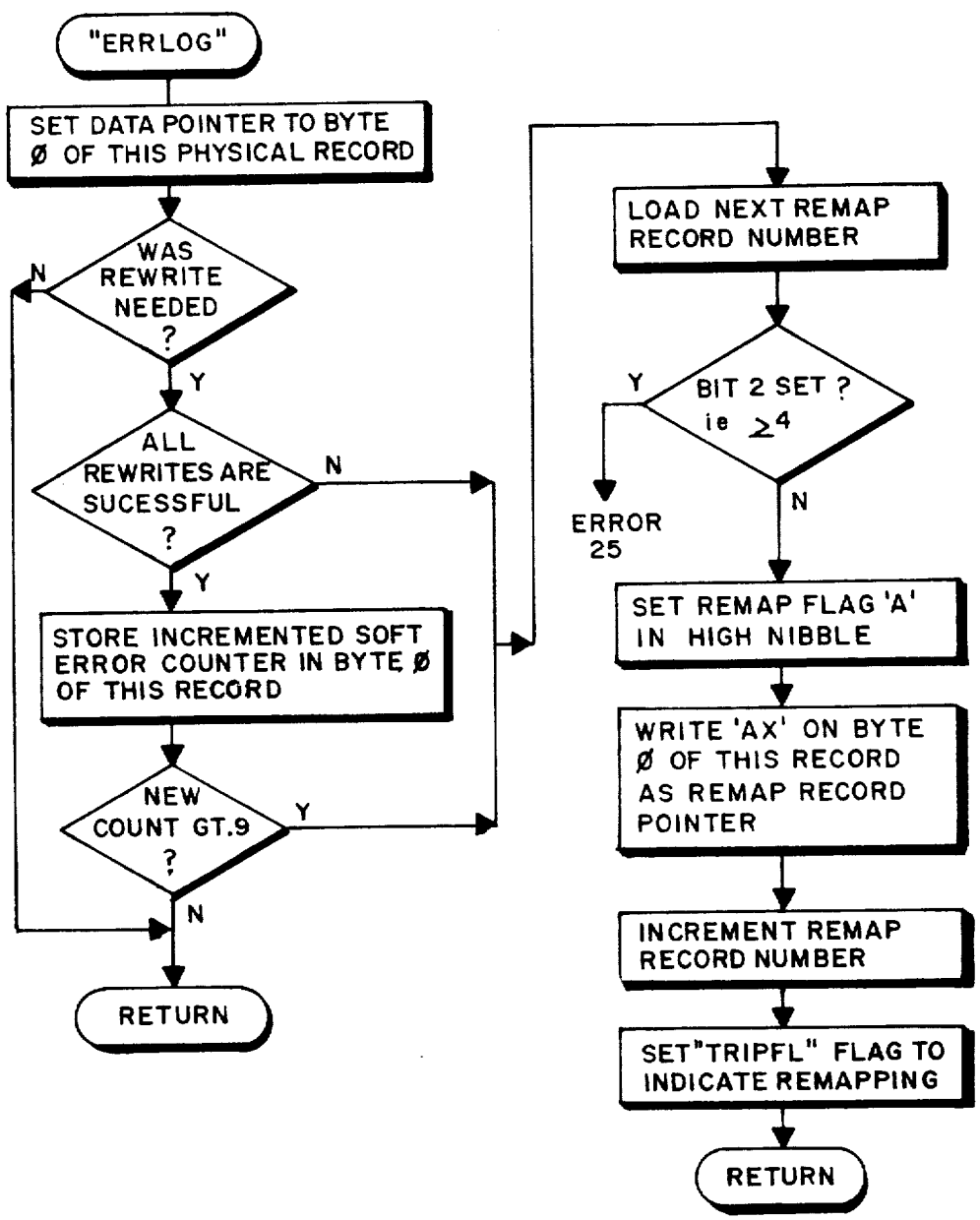
FIG. 13 is a flow chart showing trip record error logging routine.

Reference is now made to FIG. 13, trip record error logging routine. The routine determines whether a remap operation is necessary and sets a remap flag in the first nibble of the record to be remapped. It further provides an indication to where this record will be placed in memory.

Figure 14:
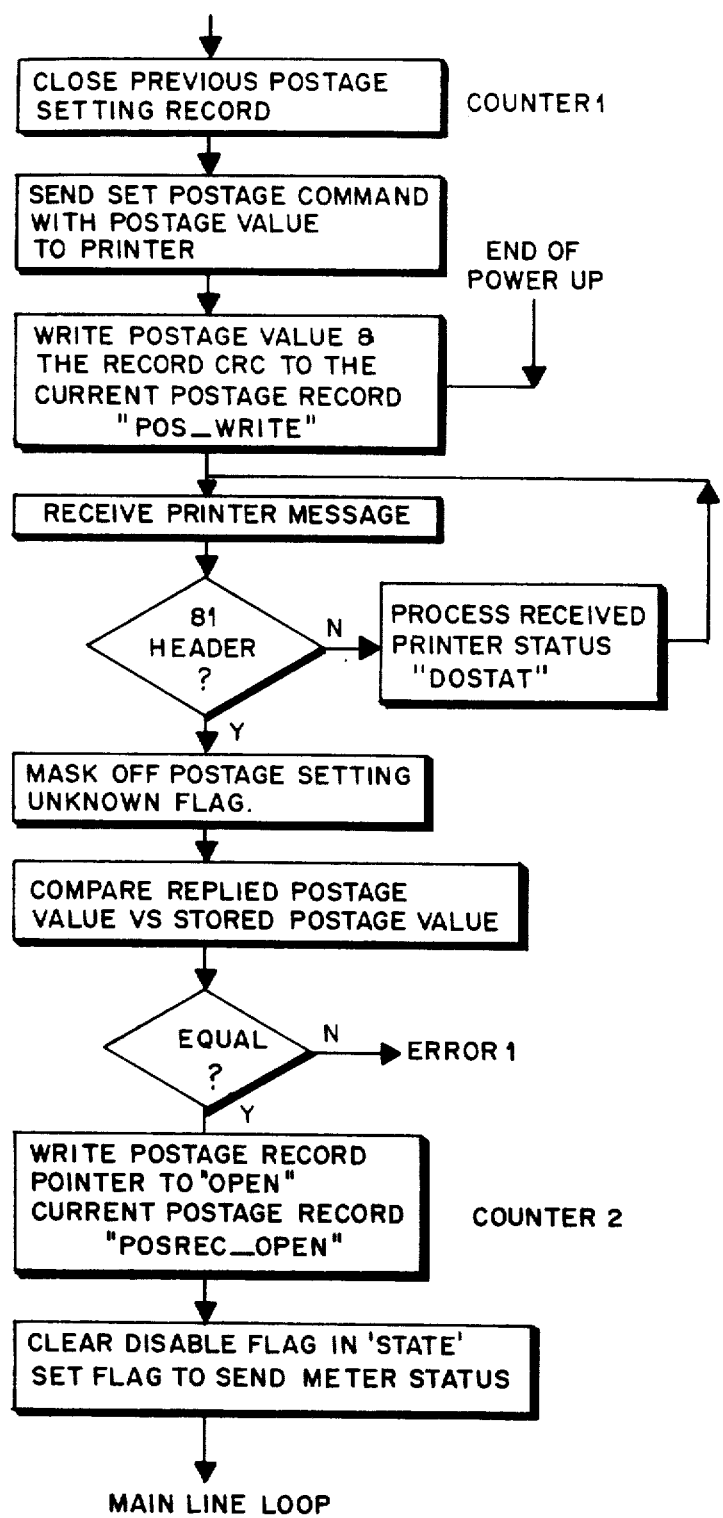
FIG. 14 is a flow chart showing set postage on print wheels routine.

Reference is now made to FIG. 14, set postage on print wheels routine. The routine provides a real time writing into the EEPROM nonvolatile memory 106 of the value to which the postage meter printing mechanism is set prior to actually tripping the meter. Specifically, the writing into this memory location occurs prior to enabling the meter for printing, that is, prior to the time at which the interposer is lifted so that the shutter bar of the meter printing mechanism can be operated to allow the printing mechanism to be caused to print. Thus, even if the power down interrupt routine malfunctions in some way, data is stored in the nonvolatile memory of the value to which the print wheels or other printing mechanism is set prior to commencement of the printing operation and accounting can be achieved on the next power up routine. The routine provides a protection against multiple failures in the system which could cause a loss of accounting data.

Figure 15:
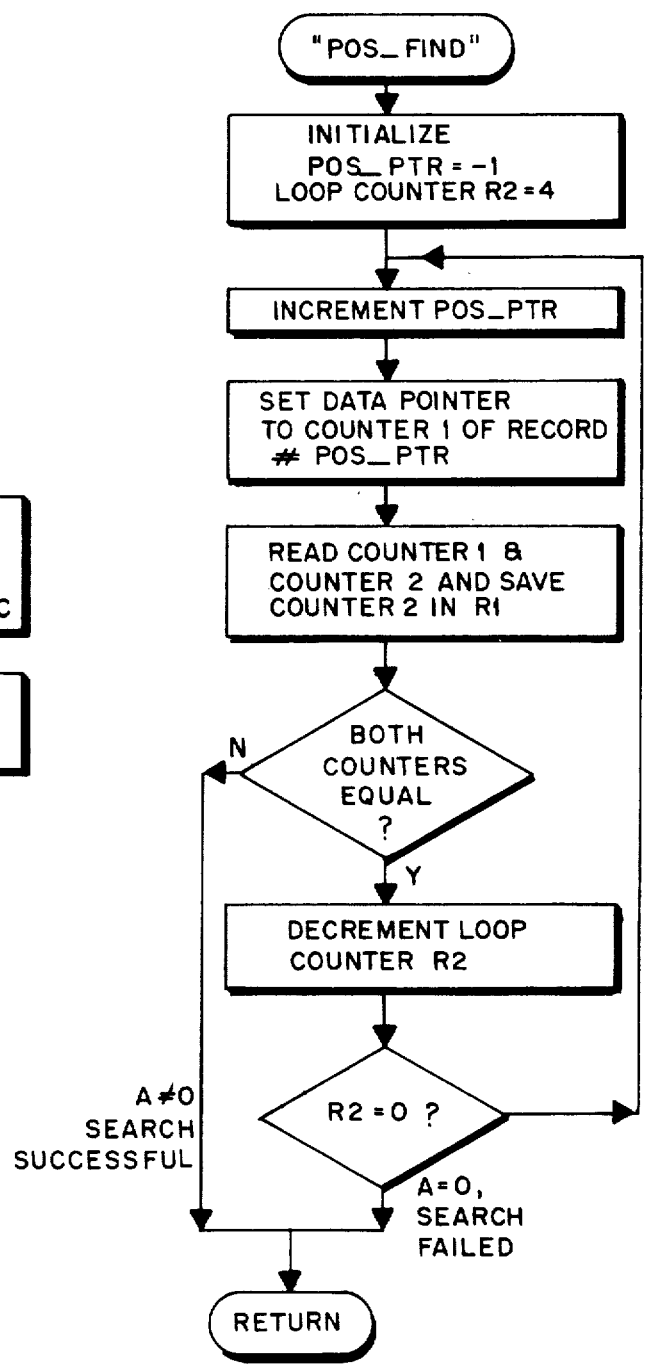
FIG. 15 is a flow chart showing find current postage record routine.

Reference is now made to FIG. 15, find current postage record routine. The routine controls the microcomputer 104 during power up to find the current postage setting record last written before the meter became inoperative due for example to a power failure or to turning off the meter.

Figure 16:
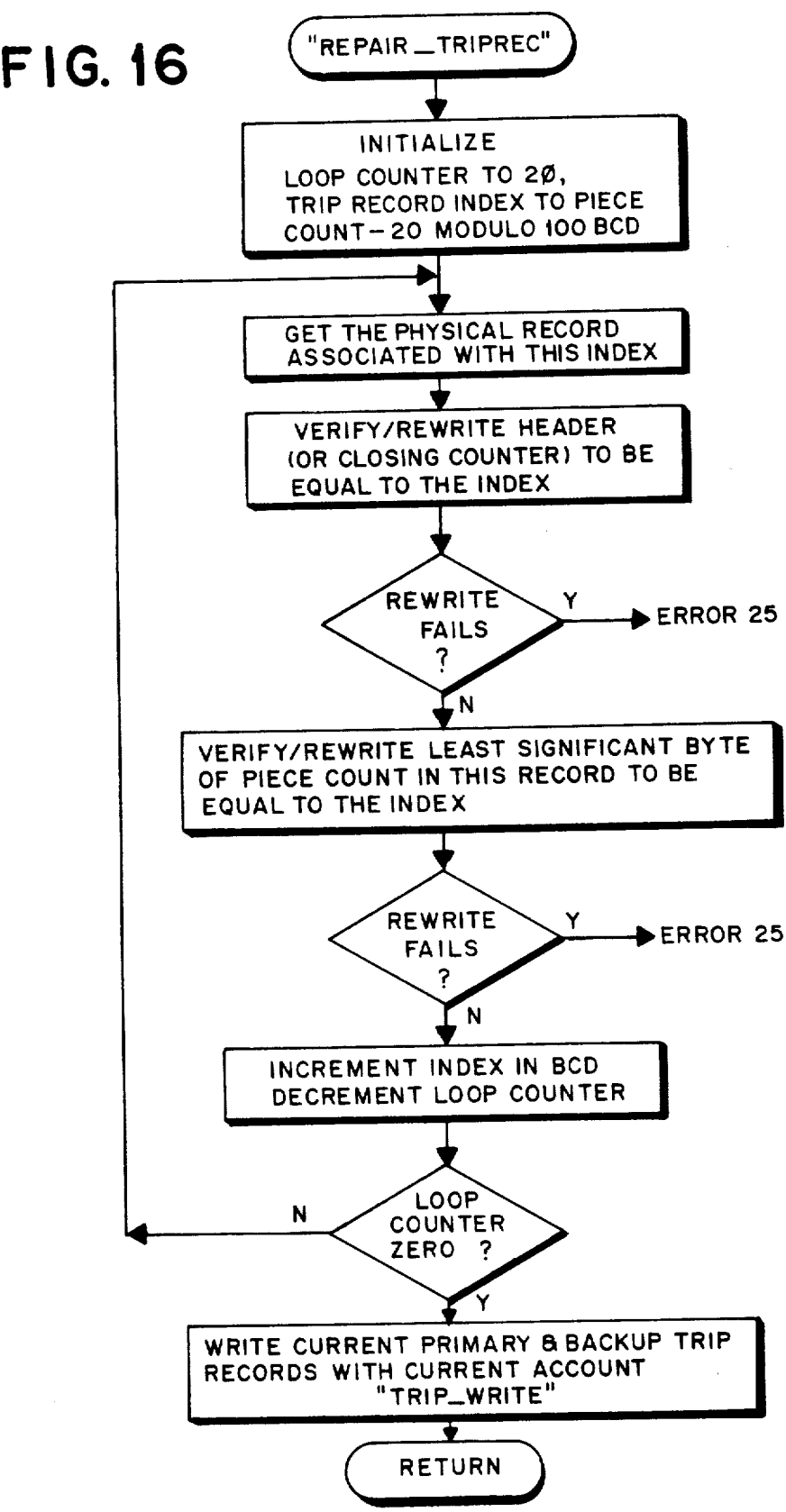
FIG. 16 is a flow chart showing repair trip record routine.

Reference is now made to FIG. 16, repair trip record routine. If one cannot locate the current transaction record, that would indicate that there is some contamination of the header data and the piece count field. In such an event, the microprocessor under control of this sub-routine takes the regular normal power down block of piece count data to reconstruct the last record location for the EEPROM 108 trip record. It is done in a manner such that all twenty headers of the transaction records are rewritten to insure integrity of the repaired trip records. This routine can also be utilized when the serial number is locked into the meter after manufacturing and testing to set the piece counter to zero.

Figure 17:
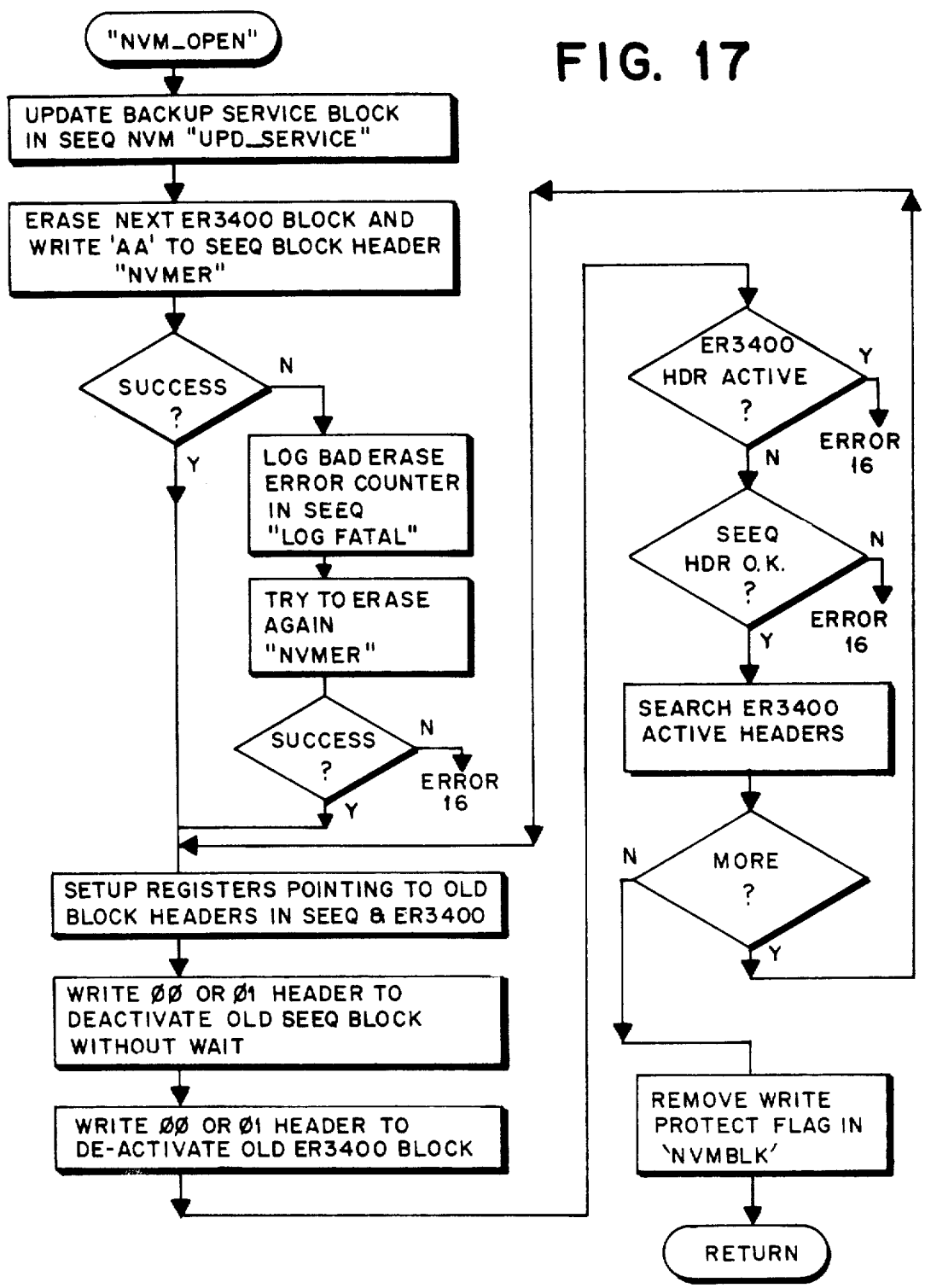
FIG. 17 is a flow chart showing open nonvolatile memory block routine.

Reference is now made to FIG. 17, open nonvolatile memory block routine. The program controls the use of a back up for emergency service block in the EEPROM nonvolatile memory 108. It is updated whenever a new MNOS nonvolatile memory block is open, and it can be uploaded if the regular service blocks in both nonvolatile memories 108 and 106 are lost or contaminated.

Figure 18:
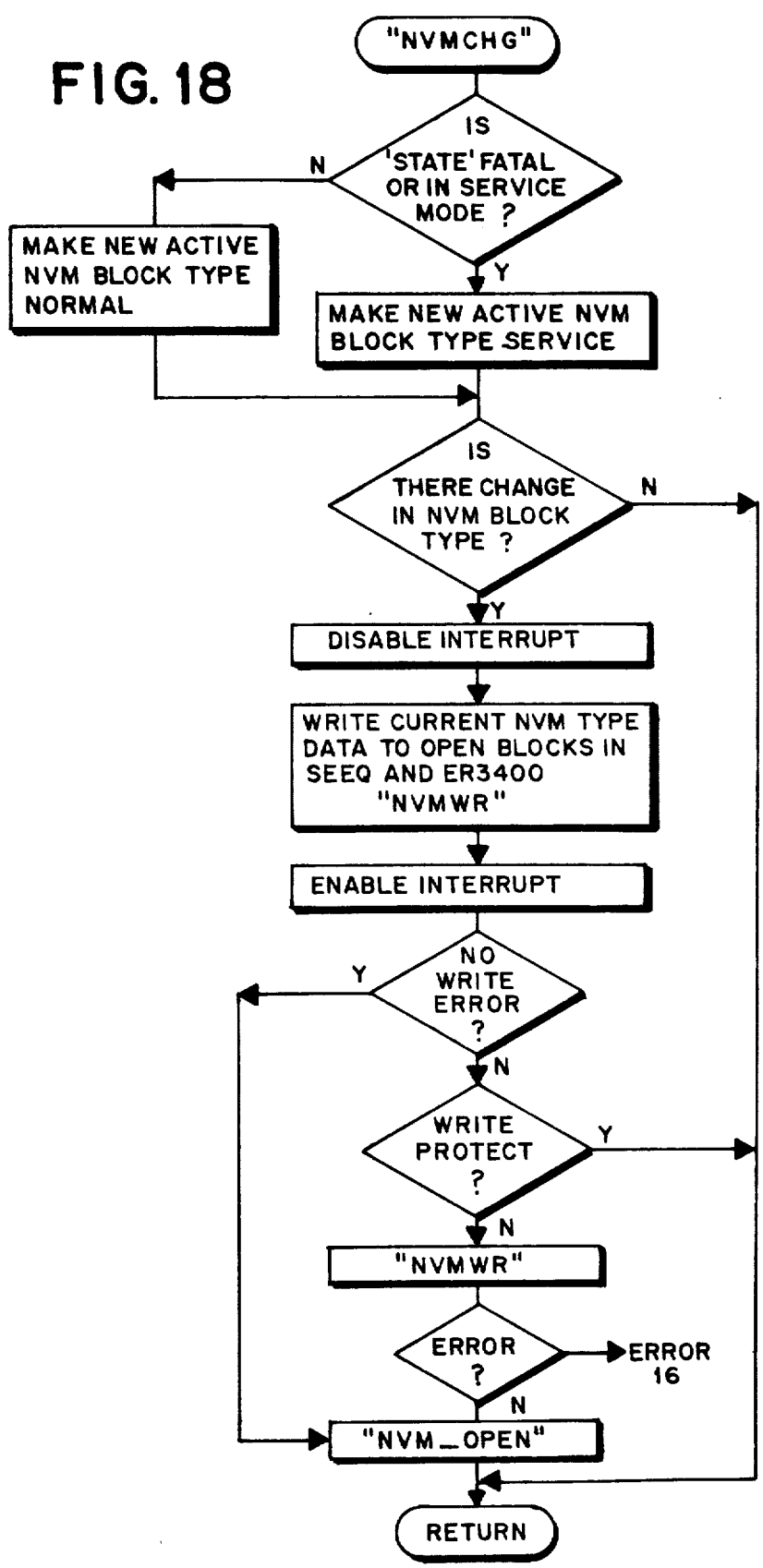
FIG. 18 is a flow chart showing update nonvolatile memory block routine.

Reference is now made to FIG. 18, update nonvolatile memory block routine. This routine controls the operation of the microcomputer 104 when the postage meter is changed between the normal mode of operation and the service mode of operation. The routine allows the microcomputer 104 to access only one of two types of blocks of data, normal accounting information or service information. The routine insures that both blocks of information are not simultaneously accessible by the microcomputer 104. This provides additional protection of the meter against the inadvertent loss of data and funds.

As can be seen from above the software causes the microcomputer to operate in a unique manner to achieve an enhanced reliability. The accounting microcomputer 104 writes two trip records to the EEPROM nonvolatile memory while the postage is being dispensed. Both records contain critical accounting data including piece count, ascending and descending registers, their CRC's and a data stream CRC. The primary records also contain less critical data such as postage selection value, batch count, batch amount, and the like. Accounting data of the most recent twenty transactions are always maintained within the EEPROM nonvolatile memory 108.

The accounting microcomputer 104 verifies critical data of both trip records and rewrites them if necessary. If the rewrite is successful, a nonvolatile memory write soft error counter in the EEPROM nonvolatile memory 108 for that physical record is incremented. If the rewrite fails or if the soft error count exceeds a maximum limit, the record will be redirected to one of the four reserved records. While a soft nonvolatile memory error is transparent to an observer, a redirection to a reserved record would bring the meter to a "fatal" mode with the new error code 25 and the meter is immediately disabled. The fatal condition can be removed only by powering down the meter and powering it up again. On the next power up, the meter will be locked out if there is no more reserved record available on either of the two trip record sets. At power down or block switching time, the microcomputer 104 writes either operational (normal) or service block data to both the EEPROM nonvolatile memory 108 and the MNOS nonvolatile memory 106. The microcomputer also keeps an "emergency service block" in the EEPROM nonvolatile memory 108. It is updated whenever a new MNOS nonvolatile memory 108 block is opened and can be uploaded into the microcomputer random access memory if the regular service block in both the MNOS memory 106 and the EEPROM memory 108 are lost or contaminated.

At power up time, the power down block data from both nonvolatile memories are read into the microcomputer 104 random access memory. Data in the "trip records" are also searched and read. If the data are not corrupted and passed the control sum test, the ascending and descending registers from the trip record must agree with those read from the power down block (of the MNOS nonvolatile memory in regular cases), otherwise the meter will be locked out to preclude further operation as a code 27 fatal error.

Finally, in the service mode, the descending register of the current trip record stored in the EEPROM nonvolatile memory 108 can be displayed by depressing the postage meter batch count key, not shown.

While this invention has been disclosed and described with reference to the particular embodiments shown herein, it will be apparent that variations and modifications may be made, and it is intended in the following claims to cover such variations and modifications as fall within the true spirit and scope of the invention.

What is claimed is:

1. In a postage meter system of the type including a microcomputer means, nonvolatile memory means, and program store means, the improvement comprising: said nonvolatile memory means having locations for storing postage meter transactional accounting data records; each transactional accounting data record having a heater portion including piece count related data and a piece count data field one of said locations having stored thereat a most current stored transactional accounting record including a most current stored transactional accounting record heater; the most current stored transactional data which differs from the piece count data stored in the piece count field; and, wherein others of said locations stored transactional accounting records having headers with piece count related data which is the same as the piece count data stored in the piece count field such that the most current stored transactional accounting record can be rapidly identified.

2. A system as defined in claim 1 further including a plurality of nonvolatile memory locations for storing postage value setting prior to the commencement of a postage dispensing transaction; and said microcomputer means responding to said postage setting data and the most current postage transactional accounting data record to reconstruct a postage meter transaction for writing a new valid postage transactional accounting record should a writing into nonvolatile memory fault occur during the concurrence of a postage meter transaction and the powering down of the postage meter system.

3. A system as defined in claim 1 wherein said postage transactional accounting records include a field for the storage of soft error counter data or remap record pointer.

4. A system as defined in claim 1 further including maintaining individual error counter information for a number of separate error conditions.

5. A system as defined in claim 4 wherein said individual error counter information is of a first type such that the occurrence of a single such error causes the microcomputer means to set a flag and preclude said postage meter system from further operation until a power down and power up sequence has occurred and is of a second type which if such error occurs more than a predetermined number of times per predetermined number of postage meter transaction operations, will cause said microcomputer to set a flag to permanently preclude said postage meter system from further operation until said meter system is taken out of service.

6. A postage meter system comprising:
a microcomputer means;
nonvolatile memory means;
random access memory means; and,
program store means including means to cause said microcomputer means to write at least three records including a first full set of critical postage accounting data into locations in the random access memory, a second full set of critical accounting data into the nonvolatile memory means and a third set of abbreviated critical accounting data into said nonvolatile memory;
said program store means further including means responsive to an error detected in at least one of the sets of data in said location in said non-volatile memory to causes said microcomputer means, upon a comparison of data in said random access memory and said nonvolatile memory where said data in the random access memory is used as the accurate reference data, to rewrite data into both the full set of critical accounting data stored in the non-volatile memory and the abbreviated critical accounting data stored in the nonvolatile memory.

7. A system as defined in claim 6 wherein the nonvolatile memory includes a plurality of predetermined number of record locations saved in reserve for the full critical accounting data and for the abbreviated critical accounting data and wherein the microcomputer means responds to a primary record location failure for either the full data or the abbreviated data to activate unused reserve record location, said unused location in conjunction with a remap record pointer causes the unused reserve record locations to function as the primary record location.

8. A system as defined in claim 7 said microcomputer means sets a flag to render said meter system inoperable when said predetermined number of unused locations have been utilized.

9. A system as defined in claim 6 wherein said comparison is between critical accounting portion of the full critical accounting data and corresponding data in the random access memory.

10. A system as defined in claim 9 where in a soft error counter is incremented when an error in the critical accounting data is detected and a rewriting into said nonvolatile memory means has occurred successfully.

11. A system as defined in claim 9 wherein the critical postage transactional accounting data comprises: the piece count, the desceneding amount of total postage available for printing, and the ascending amount of total postage printed.

12. A system as defined in claim 11 wherein the critical postage transaction accounting data further includes a the cyclic redundancy check for the descending total and the ascending total.

* * * * *